(12) United States Patent
Ueno et al.

(10) Patent No.: US 9,921,883 B2
(45) Date of Patent: Mar. 20, 2018

(54) JOB MANAGEMENT DEVICE AND METHOD FOR DETERMINING PROCESSING ELEMENTS FOR JOB ASSIGNMENT

(71) Applicant: FUJITSU LIMITED, Kawasaki-shi, Kanagawa (JP)

(72) Inventors: Tsutomu Ueno, Numazu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/976,391

(22) Filed: Dec. 21, 2015

(65) Prior Publication Data

US 2016/0217007 A1    Jul. 28, 2016

(30) Foreign Application Priority Data

Jan. 22, 2015 (JP) ................................ 2015-010107

(51) Int. Cl.
*G06F 9/50* (2006.01)
*G06F 17/30* (2006.01)
(Continued)

(52) U.S. Cl.
CPC ............ *G06F 9/505* (2013.01); *G06F 9/5083* (2013.01); *G06F 17/30958* (2013.01);
(Continued)

(58) Field of Classification Search
None
See application file for complete search history.

(56) References Cited

U.S. PATENT DOCUMENTS 8,046,206 B1 * 10/2011 Hood, III ............ G06F 17/5045
703/13
9,231,833 B1 * 1/2016 Bandopadhyay ....... H04L 41/12
(Continued)

FOREIGN PATENT DOCUMENTS

JP    2008-71294    3/2008
JP    2009-70264    4/2009
(Continued)

OTHER PUBLICATIONS

"SLURM User and Administrator Guide for Cray systems", Lawrence Livermore National Laboratory, SLURM @LLNL, v2.3, Modified Aug. 1, 2011, 8 pages.

*Primary Examiner* — Abu Zar Ghaffari
(74) *Attorney, Agent, or Firm* — Oblon, McClelland, Maier & Neustadt, L.L.P.

(57) ABSTRACT

A device includes: a memory; and a processor coupled to the memory and configured to execute a process of managing data on a first subgraph that is included in a graph including vertices indicating computing resources of a system and edges indicating links between the computing resources and is provided for a first computing resource to which a first job are assigned, or data on a second subgraph that is included in the graph and connected to the first subgraph through a vertex indicating a computing resource to which none of the first job is assigned in the graph and that is provided for a second computing resource to which a second job is assigned, and a process of using the data to determine, based on the first subgraph, whether a third computing resource to which a third job is to be assigned exists.

5 Claims, 35 Drawing Sheets

(51) Int. Cl.
  *H04L 29/08* (2006.01)
  *H04L 12/751* (2013.01)
  *H04L 12/721* (2013.01)
(52) U.S. Cl.
  CPC .............. *H04L 67/10* (2013.01); *H04L 45/02* (2013.01); *H04L 45/12* (2013.01)

(56) References Cited

U.S. PATENT DOCUMENTS

| | | | |
|---|---|---|---|
| 9,454,399 B2* | 9/2016 | Iwata | G06F 9/505 |
| 2007/0271381 A1* | 11/2007 | Wholey | G06F 9/5066 |
| | | | 709/226 |
| 2009/0106184 A1* | 4/2009 | Lang | G06N 5/02 |
| | | | 706/59 |
| 2010/0060643 A1* | 3/2010 | Kolipaka | G06T 11/206 |
| | | | 345/440 |
| 2010/0229178 A1 | 9/2010 | Ito | |
| 2011/0202511 A1* | 8/2011 | Sityon | G06F 17/30958 |
| | | | 707/706 |
| 2011/0270853 A1* | 11/2011 | Curbera | G06F 17/30958 |
| | | | 707/755 |
| 2011/0276682 A1* | 11/2011 | Ding | G06F 9/54 |
| | | | 709/224 |
| 2012/0185275 A1* | 7/2012 | Loghmani | G06F 19/328 |
| | | | 705/3 |
| 2012/0317142 A1* | 12/2012 | Broecheler | G06F 17/30958 |
| | | | 707/770 |
| 2015/0170316 A1* | 6/2015 | Balmin | G06F 17/10 |
| | | | 345/503 |
| 2015/0381515 A1* | 12/2015 | Mattson | H04L 41/145 |
| | | | 707/609 |

FOREIGN PATENT DOCUMENTS

| | | |
|---|---|---|
| JP | 2010-204880 | 9/2010 |
| WO | WO 2005/116832 A1 | 12/2005 |

* cited by examiner

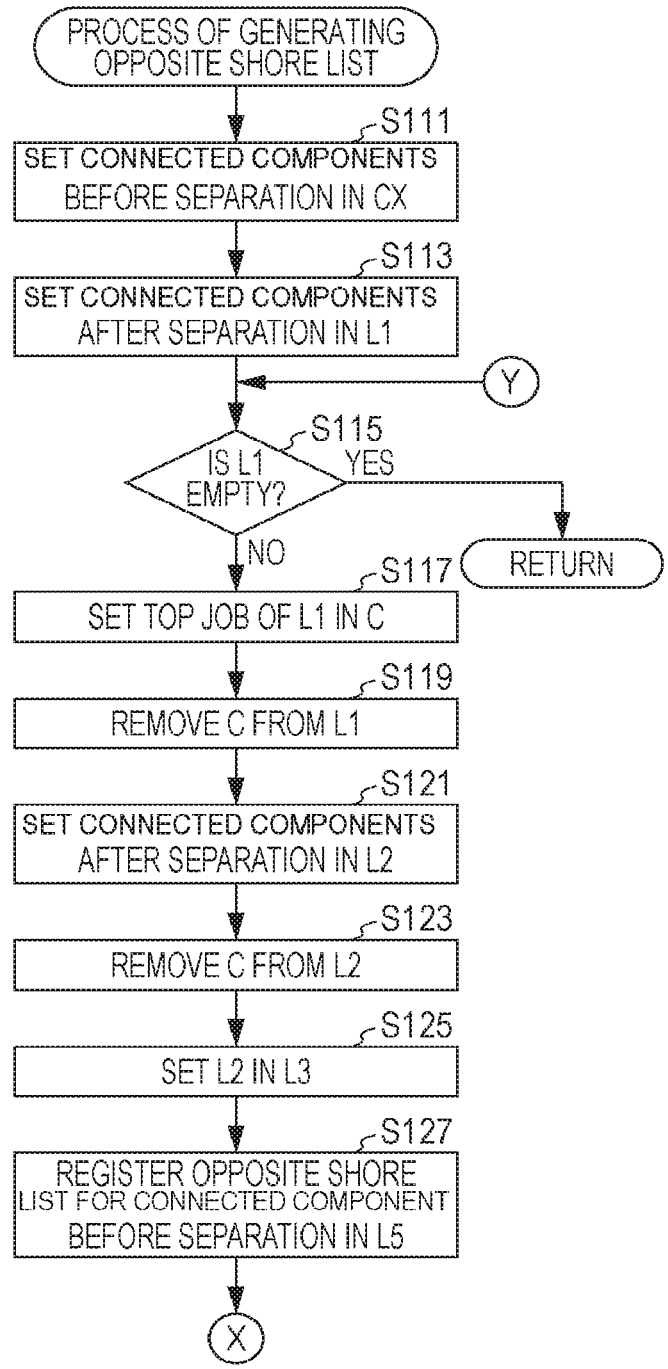

FIG. 31

| JOB ID |
|---|
| USER ID |
| JOB ATTRIBUTE VALUE |
| SIZE IN FIRST DIMENSION |
| SIZE IN SECOND DIMENSION |
| ⋮ |
| SIZE IN NTH DIMENSION |

FIG. 32

| |
|---|
| JOB ID |
| USER ID |
| ⋮ |
| PLANNED START TIME |
| PLANNED END TIME |
| MINIMUM VALUE IN FIRST DIMENSION |
| ⋮ |
| MINIMUM VALUE IN NTH DIMENSION |
| MAXIMUM VALUE IN FIRST DIMENSION |
| ⋮ |
| MAXIMUM VALUE IN NTH DIMENSION |
| NEXT JOB WITHIN HASH TABLE FOR AVAILABLE TIME ZONE |
| PREVIOUS JOB WITHIN HASH TABLE FOR AVAILABLE TIME ZONE |
| NEXT JOB WITHIN HASH TABLE FOR FIRST DIMENSION |
| PREVIOUS JOB WITHIN HASH TABLE FOR FIRST DIMENSION |
| ⋮ |
| NEXT JOB WITHIN HASH TABLE FOR NTH DIMENSION |
| PREVIOUS JOB WITHIN HASH TABLE FOR NTH DIMENSION |
| START POINT WITHIN ADJACENCY LIST FOR AVAILABLE TIME ZONE |
| END POINT WITHIN ADJACENCY LIST FOR AVAILABLE TIME ZONE |
| START POINT WITHIN ADJACENCY LIST FOR FIRST DIMENSION |
| END POINT WITHIN ADJACENCY LIST FOR FIRST DIMENSION |
| ⋮ |
| START POINT WITHIN ADJACENCY LIST FOR NTH DIMENSION |
| END POINT WITHIN ADJACENCY LIST FOR NTH DIMENSION |
| START POINT OF ADJACENCY LIST |
| END POINT OF ADJACENCY LIST |
| START POINT OF OPPOSITE SHORE LIST FOR JOB |
| END POINT OF OPPOSITE SHORE LIST FOR JOB |
| POINTER POINTING TO CONNECTED COMPONENT CONTROL TABLE |

FIG. 33

| |
|---|
| CONNECTED COMPONENT ID |
| EARLIEST START TIME WITHIN CONNECTED COMPONENT |
| LATEST END TIME WITHIN CONNECTED COMPONENT |
| MINIMUM VALUE IN FIRST DIMENSION WITHIN CONNECTED COMPONENT |
| ⋮ |
| MINIMUM VALUE IN NTH DIMENSION WITHIN CONNECTED COMPONENT |
| MAXIMUM VALUE IN FIRST DIMENSION WITHIN CONNECTED COMPONENT |
| ⋮ |
| MAXIMUM VALUE IN NTH DIMENSION WITHIN CONNECTED COMPONENT |
| START POINT OF ADJACENCY LIST FOR AVAILABLE TIME ZONE |
| END POINT OF ADJACENCY LIST FOR AVAILABLE TIME ZONE |
| START POINT OF ADJACENCY LIST FOR FIRST DIMENSION |
| END POINT OF ADJACENCY LIST FOR FIRST DIMENSION |
| ⋮ |
| START POINT OF ADJACENCY LIST FOR NTH DIMENSION |
| END POINT OF ADJACENCY LIST FOR NTH DIMENSION |
| START POINT OF ADJACENCY LIST |
| END POINT OF ADJACENCY LIST |
| START POINT OF OPPOSITE SHORE LIST |
| END POINT OF OPPOSITE SHORE LIST |

FIG. 34

| POINTER 1 POINTING TO JOB CONTROL TABLE |
|---|
| POINTER 2 POINTING TO JOB CONTROL TABLE |
| ⋮ |
| POINTER m POINTING TO JOB CONTROL TABLE |
| POINTER POINTING TO NEXT BLOCK |
| POINTER POINTING TO PREVIOUS BLOCK |

FIG. 35

| POINTER 1 POINTING TO CONNECTED COMPONENT TABLE |
|---|
| POINTER 2 POINTING TO CONNECTED COMPONENT TABLE |
| ⋮ |
| POINTER m POINTING TO CONNECTED COMPONENT TABLE |
| POINTER POINTING TO NEXT BLOCK |
| POINTER POINTING TO PREVIOUS BLOCK |

JOB MANAGEMENT DEVICE AND METHOD FOR DETERMINING PROCESSING ELEMENTS FOR JOB ASSIGNMENT

CROSS-REFERENCE TO RELATED APPLICATION

This application is based upon and claims the benefit of priority of the prior Japanese Patent Application No. 2015-010107, filed on Jan. 22, 2015, the entire contents of which are incorporated herein by reference.

FIELD

The embodiment discussed herein is related to a job management method and a job managing device.

BACKGROUND

In a large parallel computer system, it is difficult to use a network that is a crossbar interconnection network or the like and has a configuration in which "the performance of communication between multiple processors is hardly affected by the arrangement of the processors on the network", because of a problem with a cost associated with increases in the quantities of wirings and relay devices. This is due to the fact that the quantities of wirings and relay devices are proportional to the square of the number of processors in the network having the configuration. Thus, a network that is a mesh network, a torus network, or the like and has a connection configuration (or network topology) in which the quantities of wirings and relay devices are suppressed and approximately proportional to the number of processors serving as arithmetic processing devices is used in many cases.

Techniques for network topologies of large systems are currently developing. The quantities of wirings and relay devices are requested to be suppressed and approximately proportional to the number of processors as basic characteristics, similarly to the large parallel computer system. This, however, is not limited to mesh and torus networks.

In such a large system, a set of processors or a pair of the set of processors and an available time zone is assigned to each of multiple jobs (the maximum number of jobs is in a range from several thousands to several tens of thousands or is significantly large in many cases, depending on the size of the system), and the jobs are simultaneously executed in general. In this case, it is desirable that a set of processors that are assigned to jobs be arranged on a network without interference of communication traffic between the set of the processors assigned to the jobs and another set of processors assigned to other jobs. For example, if the network is a mesh network or a torus network, a method of assigning the set of the processors assigned to the jobs to a "mesh or torus (or sub-mesh or sub-torus) smaller than the network" is used in many cases.

The set of the processors to be assigned to the jobs varies depending on the number of elements, positional relationships between the processors on the network, and the like. Periods of time when the jobs are executed vary. Thus, in a large system in which positional and chronological relationships between available resources and assigned resources are likely to be complex, a process of managing resources for jobs is likely to be a bottleneck for a scheduling process. As a result, the process of managing resources may cause a reduction in the rate of using the system due to a reduction in the performance of a job scheduler or cause a reduction in the throughput of the system.

In order to reduce a process time for scheduling, it is considered to execute a process of searching, in parallel, resources to which a job is able to be assigned or divide, into multiple threads, a search range in which a set of processors able to be assigned is searched, for example. However, when the search process is executed on resources in parallel, the following problems may occur.

Specifically, an available resource that is actually able to be assigned may not be detected depending on the method of allotting the search range or a procedure for the search process. For example, for a conventional technique for using bitmap to manage available resources and assigned resources in a mesh or torus network, a method of shifting positions to be searched at intervals corresponding to shape parameters (or sizes in dimensions) of available resources to be searched and a method of shifting, in dimensions by one cell, positions to be searched are known.

In the former one of the two methods, an available resource may be overlooked. The latter method has a problem of a long search time.

In the process executed in parallel, ranges to be searched in parallel and allotted to processing elements (processors, processor sets, cores of processors, sets of cores of processors, or the like) are not appropriate, and an available resource able to be assigned may fail to be searched.

In the process executed in parallel, if the ratio of a period of time for executing the process while the process is not executed in parallel is large, the efficiency of reducing a process time due to the parallelization is reduced (Amdahl's law). Thus, it is preferable that the ratio of a period of time for executing the process in parallel to the total period of time for executing the search process be high. The conventional technique, however, is not devised in consideration of the aforementioned fact.

In the process executed in parallel, periods of time when the search process is executed on search ranges may vary depending on the search ranges, and scheduling performance may be limited due to the longest process time.

It is considered that a period of time for executing the search process that includes determination of whether or not assignment is possible depends on "the complexity of the assignment" or "the degree of progress of fragmentation of a resource region". However, a method of quantifying "the complexity of the assignment" of resources managed by a job scheduler or "the degree of progress of fragmentation" of the resources managed by the job scheduler is not established and the conventional technique does not solve the problems of quantifying "the complexity of the assignment" or "the degree of progress of fragmentation".

For example, the quantification of fragmentation in a memory region or disk region is known as a conventional technique and focuses attention on a single parameter that indicates "whether or not page numbers or block numbers of individual assigned regions (memory segments or files) or available regions are contiguous". Thus, the determination of whether or not the fragmentation exists is relatively simple, but it is considered that multiple parameters related to "connection relationships of processors within a network" affect "the degree of progress of the fragmentation" of regions for resources to be managed by the job scheduler. Thus, a method that is the same as or similar to a method using a memory or disk is not used.

Examples of related art are Japanese Laid-open Patent Publications Nos. 2010-204880, 2009-070264, and 2008-71294 and International Publication Pamphlet WO 2005/116832.

Thus, according to an aspect, an object of the disclosure is to provide a technique for improving the efficiency of the parallelization of a search process by a job scheduler executed by a job managing device configured to manage a computer system including a plurality of computers.

SUMMARY

According to an aspect of the embodiments, a device includes a memory; and one more processors coupled to the memory and configured to execute: a process of managing data on a first subgraph that is included in a graph including a plurality of vertices indicating computing resources of a computer system and a plurality of edges indicating links between the computing resources and is provided for a first computing resource to which one or more first jobs are assigned, or data on a second subgraph that is included in the graph and connected to the first subgraph through a vertex indicating a computing resource to which none of the one or more first jobs is assigned in the graph and that is provided for a second computing resource to which a second job is assigned, and a process of using the data to determine, based on the first subgraph, whether a third computing resource to which a third job is to be assigned exists.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating the flow of a process of updating an opposite shore list;

FIG. 31 is a diagram illustrating an example of data on a job waiting to be executed;

FIG. 32 is a diagram illustrating an example of a job control table;

FIG. 33 is a diagram illustrating an example of a control table for a connected component;

FIG. 34 is a diagram illustrating an example of a single block of an opposite shore list for a job;

FIG. 35 is a diagram illustrating an example of a single block of an opposite shore list for a connected component.

DESCRIPTION OF EMBODIMENT

If a system with a network topology such as a mesh or torus topology or a system with a general network topology is used, the system may be expressed using a "graph" in graphic theory by setting "vertices" corresponding to computing nodes or "resource units to be assigned to jobs" and "edges" corresponding to "network links between the resource units to be assigned to the jobs".

Figure 1:
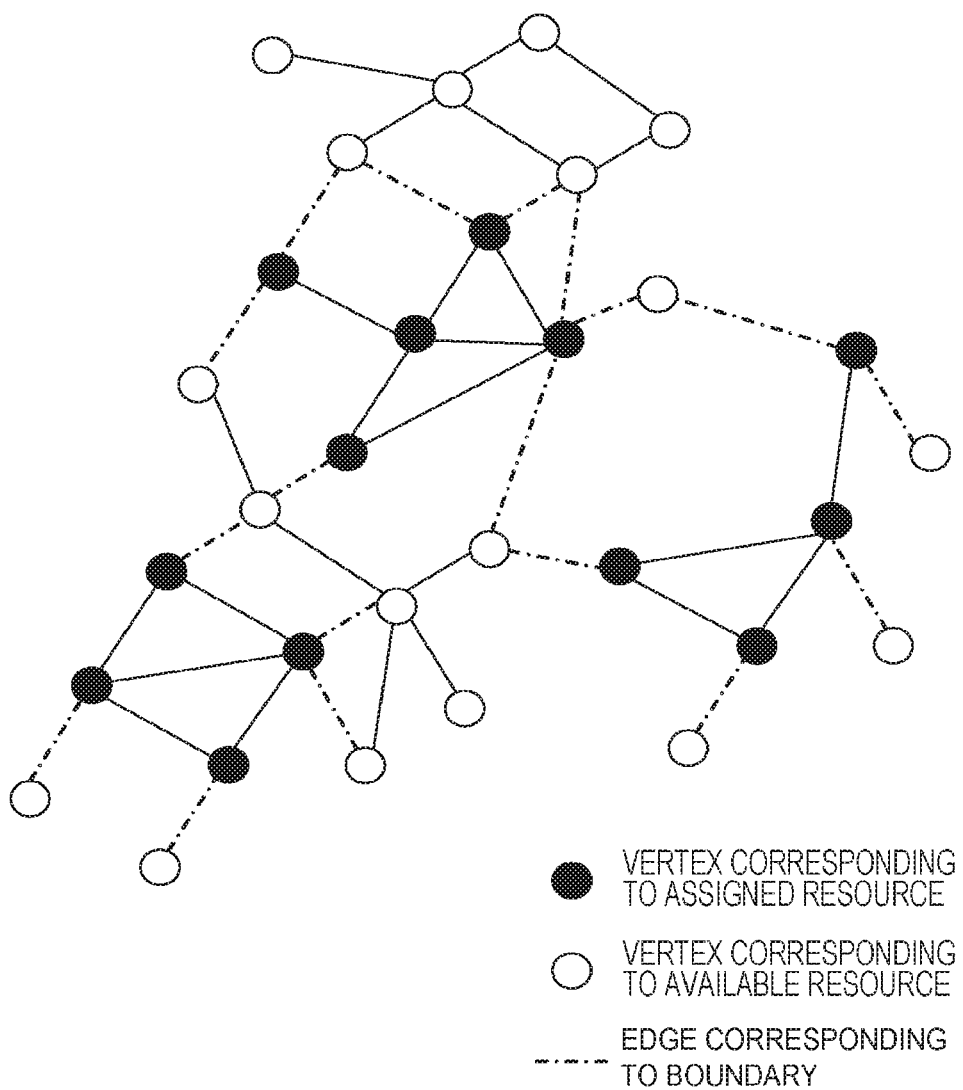
FIG. 1 is a diagram illustrating an example of a computer system expressed by a graph.

For example, as illustrated in FIG. 1, a computer system is expressed by circles corresponding to computing nodes (or resources) and network links connecting the computing nodes to each other. In FIG. 1, black circles indicate vertices corresponding to resources assigned to jobs, and white circles indicate vertices corresponding to available resources. In addition, edges indicated by solid lines indicate network links connecting the assigned resources to each other. Edges indicated by dotted lines indicate network links connecting assigned resources to available resources and corresponding to boundaries between the assigned resources and the available resources.

In an embodiment, an adjacency matrix and an incidence matrix that are generally used in order to express a graph are used. If a set of vertices of the graph is {1, 2, . . . , n}, the adjacency matrix is an n×n matrix indicating that an ij component indicates the number of edges connecting i and j to each other. Similarly, if {1, 2, . . . , m} is labeled to edges, the incidence matrix is an n×m matrix indicating that if the ij component is 1, a vertex i is connected to a side j, and if the ij component is 0, the vertex i is not connected to the side j.

Due to a cost restriction for a network topology in a large system assumed to be used in the embodiment, the "adjacency matrix" and "incidence matrix" of the graph expressing the large system are "sparse matrices (in which most of components are 0)".

In addition, in job scheduling in the large system, not only a set of processors is assigned to jobs, but also an available time zone in which the processors are used is determined and assigned to the jobs in some cases. Hereinafter, "resources" that are assigned by a job scheduler to jobs may be "a set of processors" or "a pair of the set of processors and an available time zone in which the processors are used".

If "resources" that are "a pair of a set of processors and an available time zone in which the processors are used" are used, the available time zone is expressed by integral time coordinates on a predetermined unit time basis, and a copy of the graph corresponding to the system is associated for each of the coordinates.

A graph in which each of vertices that correspond to units to be assigned to jobs and correspond to computing nodes of the computer system is connected to the other vertices at time coordinates immediately before and after the vertex is assigned to "resources".

Hereinafter, terms related to a graph are used as standard meanings in graph theory, unless otherwise specified.

Figure 2:
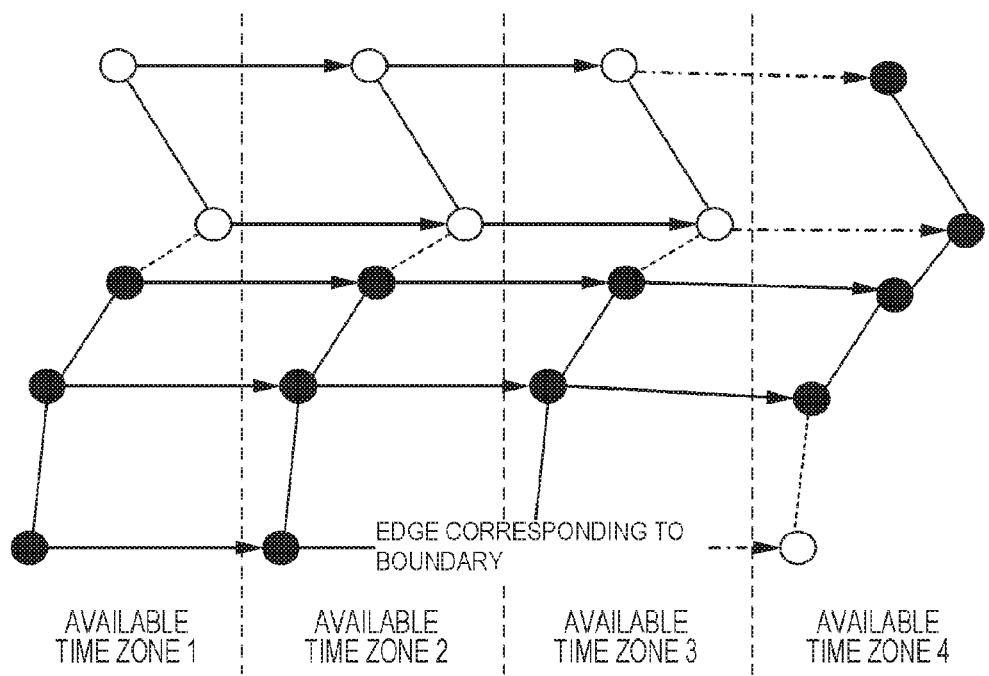
FIG. 2 is a diagram illustrating an example of a graph indicating resources including time zones.

For example, as illustrated in FIG. 2, a graph in which five vertices are connected to each other in a single column in an available time zone 1 is copied to available time zones 2 to 4, and vertices arranged in each row in the four available times zones are connected to each other by three edges (arrows). White circles, black circles, solid lines, and dotted lines indicate the same meanings as those described with reference to FIG. 1.

In the embodiment, a set of resources identified by the black circles and solid lines in FIGS. 1 and 2 is referred to as an "assigned graph" that is a subgraph corresponding to the assigned resources, for example.

In the embodiment, concepts, a "neighbor" and an "opposite offshore", are introduced for a set of connected components of an assigned graph, and a speed at which a search process is executed is increased by preparing data on the concepts before the search process. The "neighbor", however, is not a general term used in graph theory.

If coupled subgraphs C1 and C2 of a graph Γ (V, E) satisfy an equation of (C1∩C2=φ), the fact that the coupled subgraphs C1 and C2 are "in contact with" each other indicates that the coupled subgraphs C1 and C2 are included in the same connected component.

The following assumes that a set V of vertices of the graph Γ (V, E) is divided into two subsets that do not include a common vertex. (V=X∪Y)∧(X∩Y=φ)

In other words, X and Y are complementary sets for each other in the universal set V.

Based on the aforementioned assumption, a set E of edges is divided into the following three subsets in which each pair of common parts is an empty set. E1={e∈E|vertices corresponding to both ends belong to X}, E2={e∈E|vertices corresponding to both ends belong to Y}, and E3 {e∈E|one of vertices corresponding to both ends belongs to X and the other vertex belongs to Y}.

Specifically, the aforementioned equations are expressed below using symbols of sets and logical symbols. E=(E1∪E2∪E3)∧(E1∩E2=φ)∧(E2∩E3=φ)∧(E3∩E1=φ)

Hereinafter, in order to simplify expressions, a subgraph Γ (X, E1) and X are treated as the same meaning and expressed by X, and a subgraph Γ (Y, E2) and Y are treated as the same meaning and expressed by Y.

Hereinafter, a symbol SP (v1, v2) indicates a set of the shortest paths (or paths (in which the numbers of edges included in the paths are minimal) between two vertices v1 and v2. SP (v1, v2)={the shortest paths between v1 and v2}

The fact that each of the two coupled subgraphs C1 and C2 (or C1⊂X, C2⊂X, C1∩C2=φ) that do not have a common vertex in X is an opposite shore of the other subgraph is defined by the following requirements. In this case, X is treated as a land, Y is treated as a water region, and a term "opposite shore" is introduced. Since X and Y are symmetric to each other in terms of definitions, and the same definition as X may apply to a coupled subgraph of Y. A symbol ∃ is a logical sign indicating that "a component that satisfies a requirement for a variable immediately after ∃ exists". A symbol ∀ is a logical sign indicating that "all components satisfy a requirement" for a variable immediately after ∀. Hereinafter, in order to simplify expressions, requirements for an "opposite shore" are expressed using these logical signs. ∃v1∈C1, ∃v2∈C2, ∃p∈SP (v1, v2), and all vertices other than v1 and v2 of p are included in Y (or complementary set for X).

If v1 and v2 are not opposite shores, any path in which the number of edges is minimal paths through a subset (or land) of X.

A "path in which the number of edges is minimal" and that is between C1 and C2 is a solution of a "single-source shortest path problem" in a general graph and is calculated by an algorithm that is Dijkstra's Algorithm, Bellman-Ford algorithm, or the like and is known in graph theory. If a solution of an "all-pairs shortest path problem" is treated as a part of a path in which vertices of C1 and C2 are a start point and an end point, the "path in which the number of the edges is minimal" and that is between C1 and C2 is calculated by an algorithm that is Warshall-Floyd Algorithm or the like and is known in graph theory.

Graphs that correspond to mesh and torus networks may be calculated by another simple method without the use of the relatively sophisticated algorithms used in graph theory for the graphs. A data structure (for example, an R tree, an interval tree, or the like) for "nearest neighbor search" in computational geometry may be used for the graphs in the search process.

Next, the fact that each of the two coupled subgraphs C1 and C2 that are subgraphs of X and do not include a common part is the "n-th nearest neighbor of the other graph" is recursively defined as follows. In this case, n is a positive integer. (1) If each of the coupled subgraphs C1 and C2 is an "opposite shore" of the other coupled subgraph, each of the subgraphs C1 and C2 is the first nearest neighbor of the other subgraph. (2) If C3 is not an opposite shore of any of C1 and C1 and is a subset included in X or C3∩X, each of C1 and C3 is the $n_1$-th nearest neighbor of the other, each of C3 and C2 is an $n_2$-th nearest neighbor of the other, and the minimum value of ($n_1+n_2$) is n, each of C1 and C2 is the n-th nearest neighbor of the other.

Specifically, if each of C1 and C2 is the n-th nearest neighbor of the other, a number n of strings D(1), D(2), . .

. , D(n) of each coupled subgraph exist in X, D(1)=C1, D(n),=C2, and D(i) and D(i+1) are opposite shores for all values of i=1, . . . , n.

In the embodiment, for the strings of the coupled subgraphs, the expression "D(i) is on the near side of D(i+1) with respect to C1" or "D(i+1) is on the far side of D(i) with respect to C1" is used in some cases. Similarly, the expression "D(i+1) is on the near side of D(i) with respect to C2" or "D(i) is on the far side of D(i+1) with respect to C2" is used in some cases.

In the embodiment, the coupled set C is referred to as a "zeroth nearest neighbor of C" in some cases.

Since a part that is common to the different two connected components does not exist (or is an empty set), "opposite shore" relationships and "n-th nearest neighbors" are naturally defined for the connected components.

In addition, if resources are assigned to jobs so that "subgraphs corresponding to resources to be assigned to each pair of jobs are coupled" and "resources corresponding to different jobs correspond to subgraphs that do not have a common part", "opposite shore" relationships and the "n-th nearest neighbors" may be defined for the jobs.

Furthermore, for a mesh or torus network, a path between coupled subgraphs is limited to a path extending parallel to any of coordinate axes of dimensions, and the expression "each of components is an opposite shore of the other component with respect to at least one coordinate axis" is used in some cases. If "each of components is an opposite shore of the other component with respect to at least one coordinate axis", "each of the components is an opposite shore of the other component". The converse, however, may not be true.

Specifically, if all shortest paths in the two coupled subgraphs C1 and C2 in a mesh or torus topology are "inclined" ($\forall v1 \in C1$, $\forall v2 \in C2$, and coordinates of v1 on all coordinate axes are different from coordinates of v2 on all the coordinate axes) and any coordinate axis is selected, it is not said that "C1 and C2 are opposite shores on the single coordinate axis".

Figure 3:
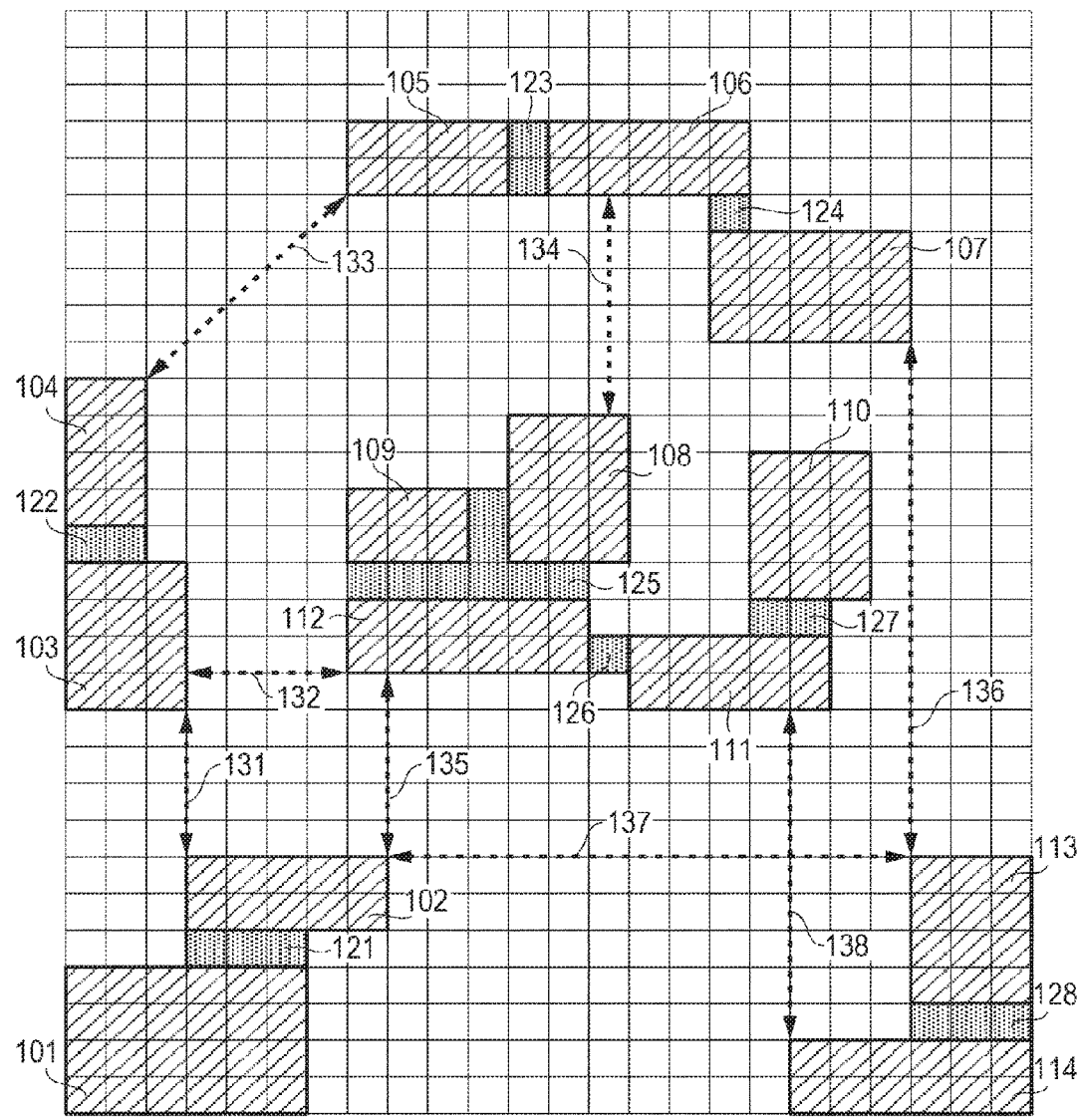
FIG. 3 is a diagram describing opposite shores.

A part of the aforementioned definitions is described using a case where a mesh illustrated in FIG. 3 is used. In FIG. 3, vertices correspond to computing nodes (or resources), and edges between the vertices correspond to network links. In FIG. 3, each of regions 101 to 114 surrounded by diagonal lines indicates a set of vertices assigned to a single job. The region 101 is in contact with the region 102, and a job is not assigned to a region 121 enclosed by edges located between the region 101 and 102. Thus, the regions 101, 102, and 121 form a connected component within an assigned graph. Similarly, the region 104 is in contact with the region 103, and a job is not assigned to a region 122 enclosed by edges located between the regions 103 and 104. Thus, the regions 103, 104, and 122 form a connected component within an assigned graph.

In addition, a region 113 is in contact with a region 114, and a job is not assigned to a region 128 enclosed by edges located between the regions 113 and 114. Thus, the regions 113, 114, and 128 form a connected component within an assigned graph.

Furthermore, a region 106 is in contact with regions 105 and 107, a job is not assigned to a region 123 enclosed by edges located between the regions 106 and 105, and a job is not assigned to a region 124 enclosed by edges located between the regions 106 and 107. Thus, the regions 105 to 107, 123, and 124 form a connected component within an assigned graph.

Furthermore, a region 112 is in contact with regions 109, 108, and 111. The region 111 is in contact with a region 110. A job is not assigned to a region 125 enclosed by edges located between the region 112 and the regions 109 and 108 and edges located between the regions 109 and 108, and a job is not assigned to a region 126 enclosed by edges located between the regions 112 and 111. A job is not assigned to a region 127 enclosed by edges between the regions 111 and 110. Thus, the regions 108 to 112 and 125 to 127 form a connected component within an assigned graph.

In FIG. 3, "opposite shore" relationships between the connected components within the assigned graphs are indicated by double-headed dotted arrows 131 to 138. Specifically, opposite shores of the connected component including the regions 101, 102, and 121 are the connected component including the regions 103, 104, and 122, the connected component including the regions 108 to 112 and 125 to 127, and the connected component including the regions 113, 114, and 128.

Opposite shores of the connected component including the regions 103, 104, and 122 are the connected component including the regions 101, 102, and 121, the connected component including the regions 108 to 112 and 125 to 127, and the connected component including the regions 105 to 107, 123, and 124.

Opposite shores of the connected component including the regions 105 to 107, 123, and 124 are the connected component including the regions 103, 104, and 122, the connected component including the regions 108 to 112 and 125 to 127, and the connected component including the regions 113, 114, and 128.

Opposite shores of the connected component including the regions 108 to 112 and 125 to 127 are all the other connected components.

Opposite shores of the connected component including the regions 113, 114, and 128 are the connected component including the regions 105 to 107, 123, and 124, the connected component including the regions 108 to 112 and 125 to 127, and the connected component including the regions 101, 102, and 121.

In the embodiment, resources assigned to jobs are managed and unassigned resources are indirectly managed as "resources excluding the "assigned resources" from all resources of the system".

In the embodiment, for example, connected components that are opposite shores of each connected component are recognized as limiting points of ranges to be searched, and a search process of determining whether or not resources are secured for a new job is executed in order from the connected component at a high speed.

In addition, in the embodiment, in order to avoid the fact that a period of time for executing the search process significantly varies depending on a range to be searched, a new parameter indicating the complexity (or the degree of progress of fragmentation) of resource assignment is introduced, and the period of time for executing the search process may be accurately estimated.

A configuration for achieving the aforementioned technical items is described below in detail.

Figure 4:
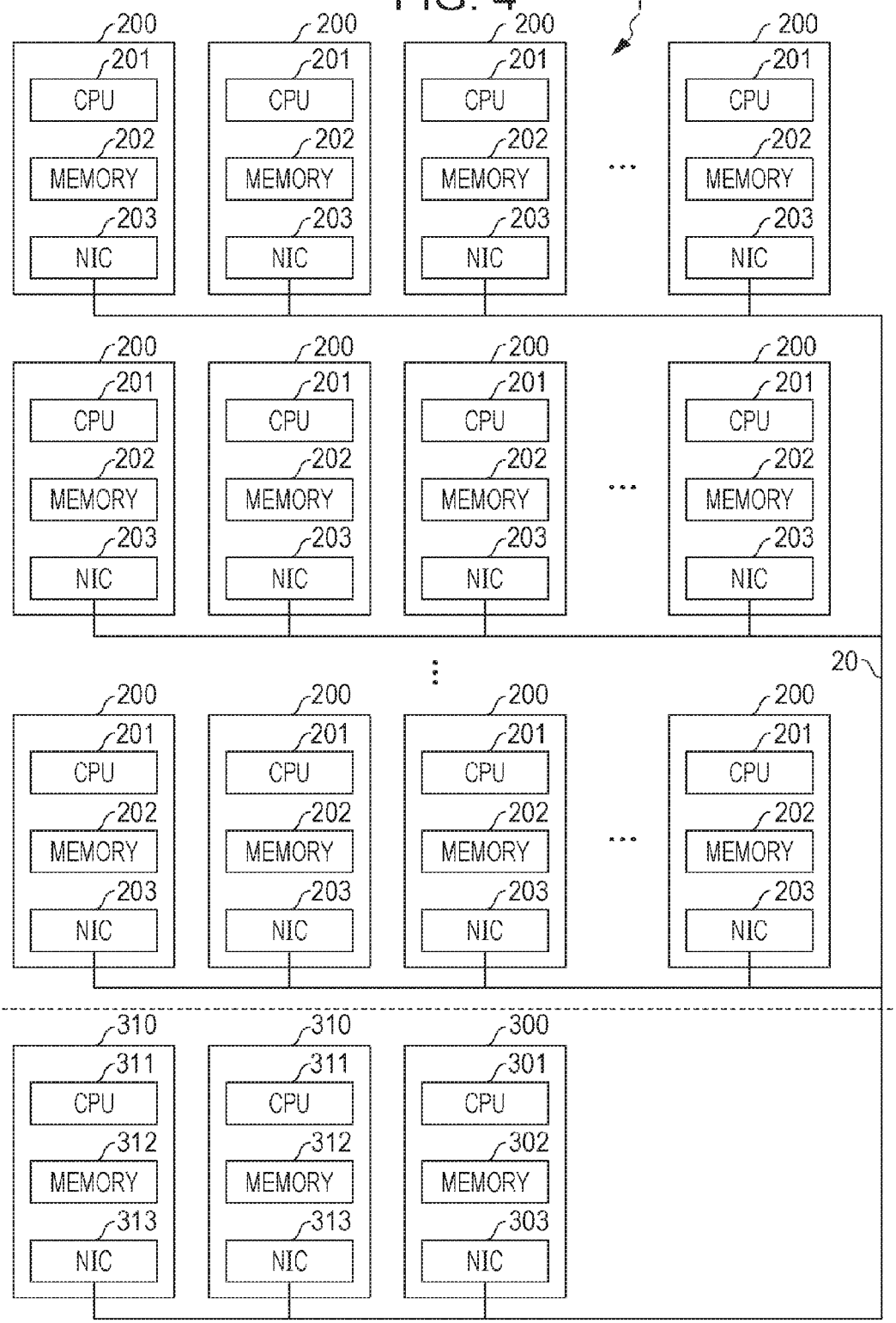
FIG. 4 is a diagram illustrating an example of a computer system according to an embodiment.

As illustrated in FIG. 4, in a parallel computer system 1, multiple computing nodes 200 are connected to and able to communicate with each other through a network 20 and this configuration forms an interconnection network. In addition, the network 20 is connected to a single master scheduler node 300 and multiple slave scheduler nodes 310.

The network 20 is a communication line and is, for example, a local area network (LAN) or an optical communication path.

The computing nodes 200 are information processing devices and have the same configuration. As illustrated in FIG. 4, the computing nodes 200 each include a central processing unit (CPU) 201, a memory 202, and a network interface card (NIC) 203.

The NIC 203 is a communication section connecting the computing node 200 to the network 20. The NIC 203 communicates data with the other computing nodes 200, the master scheduler node 300, other information processing devices operated by users, and the like through the network 20, for example. The NIC 203 is, for example, a LAN interface card.

The memory 202 is a storage device including a read only memory (ROM) and a random access memory (RAM). A program related to calculation of various types and data for the program are written in the ROM of the memory 202. The program on the memory 202 is read into the CPU 201 and executed by the CPU 201. The RAM of the memory 202 stores the program to be executed by the CPU 201 and the data to be used by the program.

The CPU 201 is a processing device for executing control of various types and calculation of various types and achieves various functions by executing an operating system (OS) stored in the memory 202 and the program stored in the memory 202. Specifically, the CPU 201 executes an arithmetic process on data received through the NIC 203 and the network 20. In addition, the CPU 201 outputs data such as results of the arithmetic process through the NIC 203 and the network 20 so as to transmit the data to the other computing nodes 200 and the like.

As described above, a job is assigned to one or multiple computing nodes 200 in the parallel computer system 1.

The master scheduler node 300 is a job managing device configured to control the slave scheduler nodes 310 and execute processes such as a process of determining a computing node 200 to which a job is to be assigned.

The master scheduler node 300 is an information processing device serving as the job managing device and includes a CPU 301, a memory 302, and an NIC 303. The CPU 301 is composed of a multiprocessor or a multicore processor.

The NIC 303 is a communication section connecting the master scheduler node 300 to the network 20 and communicates data with the computing nodes 200, the slave scheduler nodes 310, the other information processing devices operated by the users, and the like through the network 20. The NIC 303 is, for example, a LAN interface card.

The memory 302 is a storage device including a ROM and a RAM. A program related to job scheduling including control of the slave scheduler nodes 310 and data for the program are written in the ROM of the memory 302. The program on the memory 302 is read into the CPU 301 and executed by the CPU 301. The RAM of the memory 302 stores the program to be executed by the CPU 301 and the data to be used by the program.

The CPU 301 is a processing device for executing control of various types and calculation of various types and achieves various functions including a job scheduler by executing an OS stored in the memory 302 and the program stored in the memory 302.

The slave scheduler nodes 310 each execute, in accordance with instructions from the master scheduler node 300, processes such as a process of searching a computing node 200 to which a job is able to be assigned.

The slave scheduler nodes 310 are information processing devices and each include a CPU 311, a memory 312, and an NIC 313. The CPU 311 is composed of a multiprocessor or a multicore processor.

The NIC 313 is a communication section connecting the slave scheduler node 310 to the network 20 and communicates data with the computing nodes 200, the master scheduler node 300, the other information processing devices operated by the users, and the like through the network 20. The NIC 313 is, for example, a LAN interface card.

The memory 312 is a storage device including a ROM and a RAM. A program to be used to execute processes such as the process of searching a computing node 200 to which a job is able to be assigned, and data for the program, are written in the ROM of the memory 312. The program on the memory 312 is read into the CPU 311 and executed by the CPU 311. The RAM of the memory 312 stores the program to be executed by the CPU 311 and the data to be used by the program.

The CPU 311 is a processing device for executing control of various types and calculation of various types and achieves various functions including search functions of the computing nodes 200 by executing an OS stored in the memory 312 and the program stored in the memory 312.

The slave scheduler nodes 310 may be computing nodes 200 to which a job is not assigned.

Figure 5:
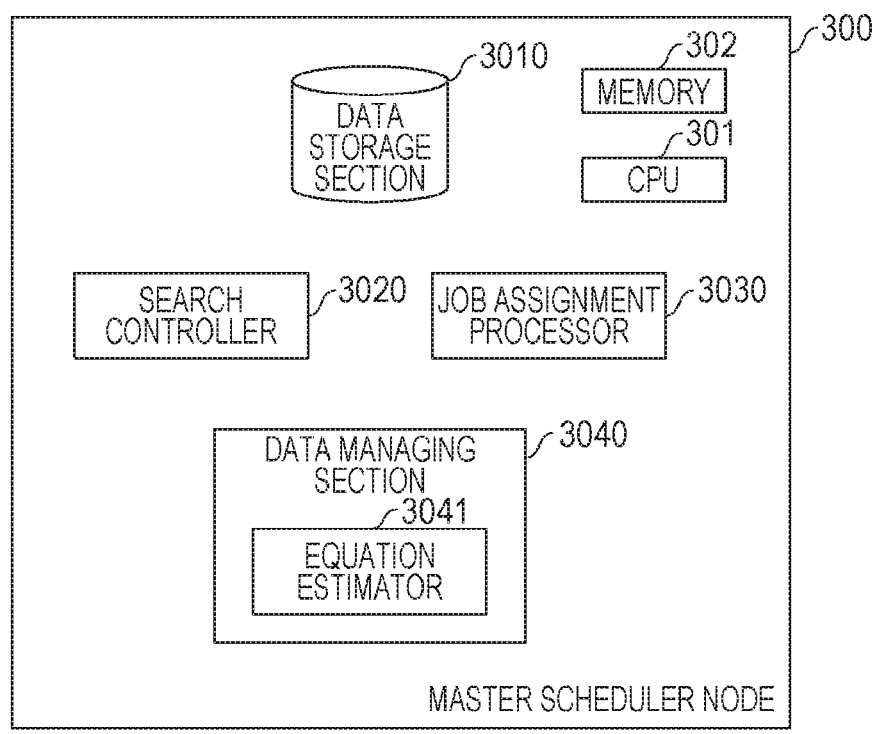
FIG. 5 is a diagram illustrating an example of a functional configuration of a master scheduler node.

Next, an example of a functional configuration achieved in the master scheduler node 300 is illustrated in FIG. 5. The master scheduler node 300 includes a data storage section 3010, a search controller 3020, a job assignment processor 3030, and a data managing section 3040.

The search controller 3020 executes, based on data stored in the data storage section 3010, a preprocess before the search process to be executed by the slave scheduler nodes 310. The search controller 3020 causes, based on the results of the preprocess, the slave scheduler nodes 310 to execute the search process.

The job assignment processor 3030 executes, based on the results of the search process executed by the slave scheduler nodes 310, processes such as a process of determining a computing node 200 to which a job is to be assigned.

The data managing section 3040 executes a process of updating data stored in the data storage section 3010 and includes an equation estimator 3041. The equation estimator 3041 executes a process of estimating an equation for a period of time for executing the search process, while the equation is used by the search controller 3020.

Figure 6:
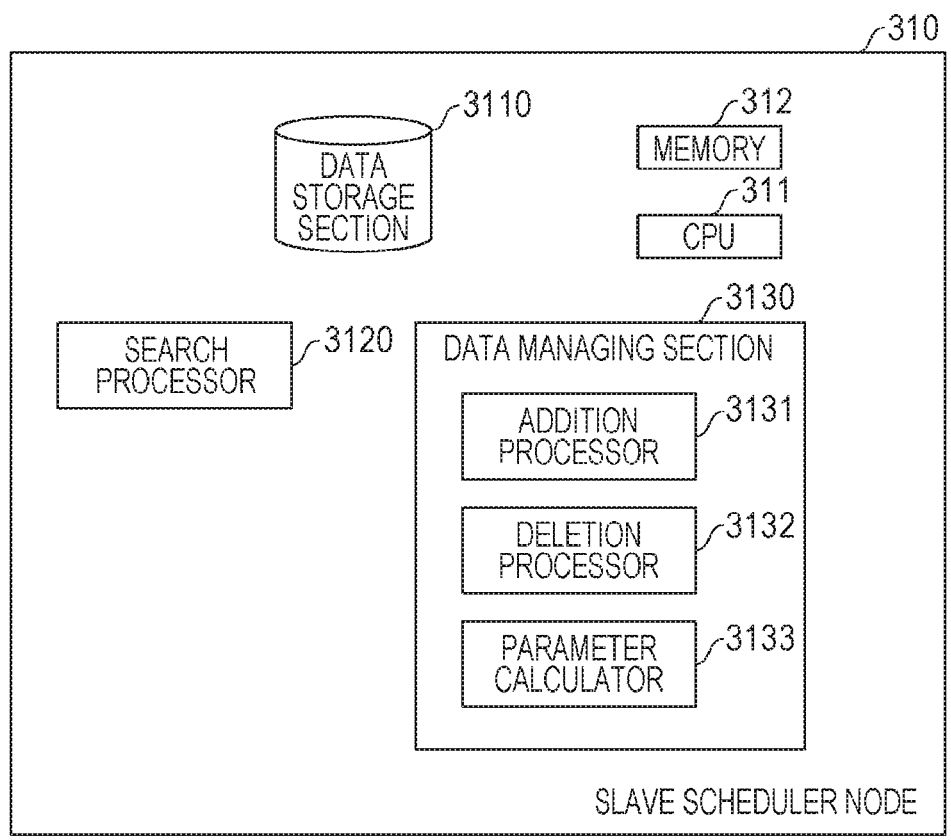
FIG. 6 is a diagram illustrating an example of a functional configuration of a slave scheduler node.

In addition, an example of a functional configuration achieved in each of the slave scheduler nodes 310 is illustrated in FIG. 6. The slave scheduler nodes 310 each include a data storage section 3110, a search processor 3120, and a data managing section 3130.

The search processor 3120 executes a process of determining, based on data stored in the data storage section 3110, whether or not a computing node to which a job is to be newly assigned exists in an allotted range to be subjected to the search process.

The data managing section 3130 executes a process of maintaining and managing data stored in the data storage section 3110 and includes an addition processor 3131, a deletion processor 3132, and a parameter calculator 3133.

The addition processor 3131 executes a process when a job is added to an allotted range to be subjected to the search process. The deletion processor 3132 executes a process when the job added to the allotted range to be subjected to the search process is terminated. The parameter calculator 3133 executes a process of calculating the value of a parameter to be used by the equation estimator 3041 and introduced in the embodiment.

The master scheduler node 300 may have functions and data of the slave scheduler nodes 310.

Next, operations of each of the slave scheduler nodes 310 are described with reference to FIGS. 7 to 22. The slave scheduler node 310 executes, in accordance with an instruction from the master scheduler node 300, the process of searching a group of computing nodes to which a new job is to be newly assigned. In order to improve the efficiency of the search process, data stored in the data storage section 3110 is updated before the search process and during the time when the search process is not executed.

As described above, in the embodiment, the search process is executed in order of connected components, and whether or not resources are secured for a new job is determined. In order to execute the search process and make the determination, data on connected components that are opposite offshores of each connected component and the like is maintained. If the assignment of a computing node to a job is to be changed, the data is updated and prepared for the search process to be next executed.

Figure 7:
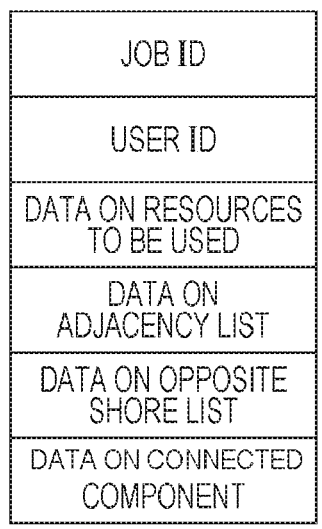
FIG. 7 is a diagram illustrating an example of data to be used to manage a job.

A list of jobs included in allotted ranges to be subjected to the search process is stored in the data storage section 3110. In addition, as illustrated in FIG. 7, the data storage section 3110 stores, for each of the jobs included in the list, a job identifier (ID), a user ID of a user who is a source of a job request, data on resources to be used in the parallel computer system 1, data on a list of jobs (referred to as adjacent jobs) that are in contact with the job, data on an opposite shore list or a list of jobs that are opposite shores of the job, data on a connected component to which the job belongs, and the like.

Figure 8:
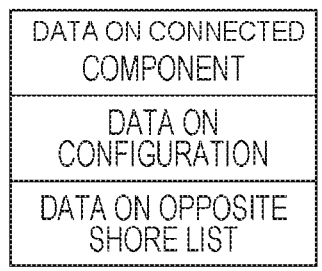
FIG. 8 is a diagram illustrating an example of data to be used to manage a connected component.

As illustrated in FIG. 8, the data storage section 3110 stores, for each connected component, a connected component ID, data (including a list of jobs included in the connected component) on the configuration of the connected component, data on a list (opposite shore list for the connected component) of jobs that are opposite shores of the connected component, and the like.

In addition, the data storage section 3110 stores an adjacency matrix and an incidence matrix.

Next, details of a process to be executed by each of the slave scheduler nodes 310 are described with reference to FIGS. 9 to 22.

Figure 9:
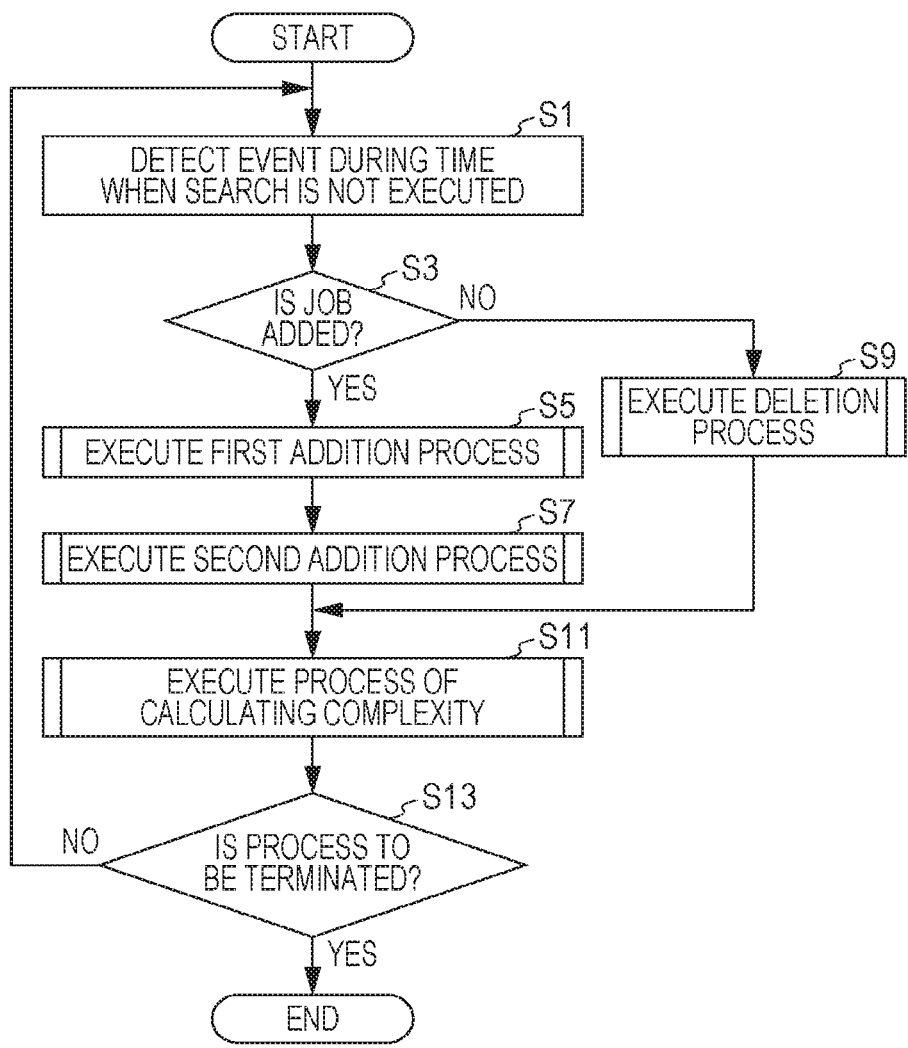
FIG. 9 is a diagram illustrating the flow of a main process to be executed by the slave scheduler node.

First, the flow of a main process is described with reference to FIG. 9.

The data managing section 3130 of the slave scheduler node 310 waits for the occurrence of a predetermined event during the time when the search processor 3120 does not execute the search process, and the data managing section 3130 detects the event upon the occurrence of the event (in step S1). The predetermined event is an event of receiving a notification indicating that a job was added or assigned in the vicinity of a connected component to which the slave scheduler node 310 is assigned. Alternatively, the predetermined even is an event of detecting that a job was terminated for the connected component to which the slave scheduler node 310 is assigned or an event of receiving a notification indicating that a computing resource assigned in the vicinity of the connected component was released. The notification indicating that the job was added or assigned includes data identifying a computing node to which the job was assigned.

If an event of adding a job is detected (Yes in step S3), the addition processor 3131 of the data managing section 3130 executes a first addition process (in step S5). In addition, the addition processor 3131 executes a second addition process (in step S7). The first and second addition processes are described later in detail and are to update an adjacency list and an opposite shore list based on the added job. Then, the process proceeds to step S11.

On the other hand, if the detected event is not an event of adding a job (No in step S3), the deletion processor 3132 executes a deletion process (in step S9) in order to delete a job. The deletion process is described later in detail and is to update the adjacency list and the opposite shore list in response to the release of the computing resource. Then, the process proceeds to step S11.

Then, the parameter calculator 3133 executes a process of calculating a complexity (in step S11). In other words, the parameter calculator 3133 executes the process in order to update the complexity described later. The process of calculating the complexity is described later in detail.

Then, the data managing section 3130 determines whether or not the process is to be terminated (in step S13). If the process is not to be terminated, the process returns to step S1. On the other hand, if an instruction to terminate the process is provided, the process is terminated.

Typically, the search processor 3120 executes the search process in accordance with an instruction from the master scheduler node 300. Specifically, the search process is executed before or after the process described in FIG. 9. The search process is described later in a description of a relationship between the search process and a process to be executed by the master scheduler node 300.

Figure 10:
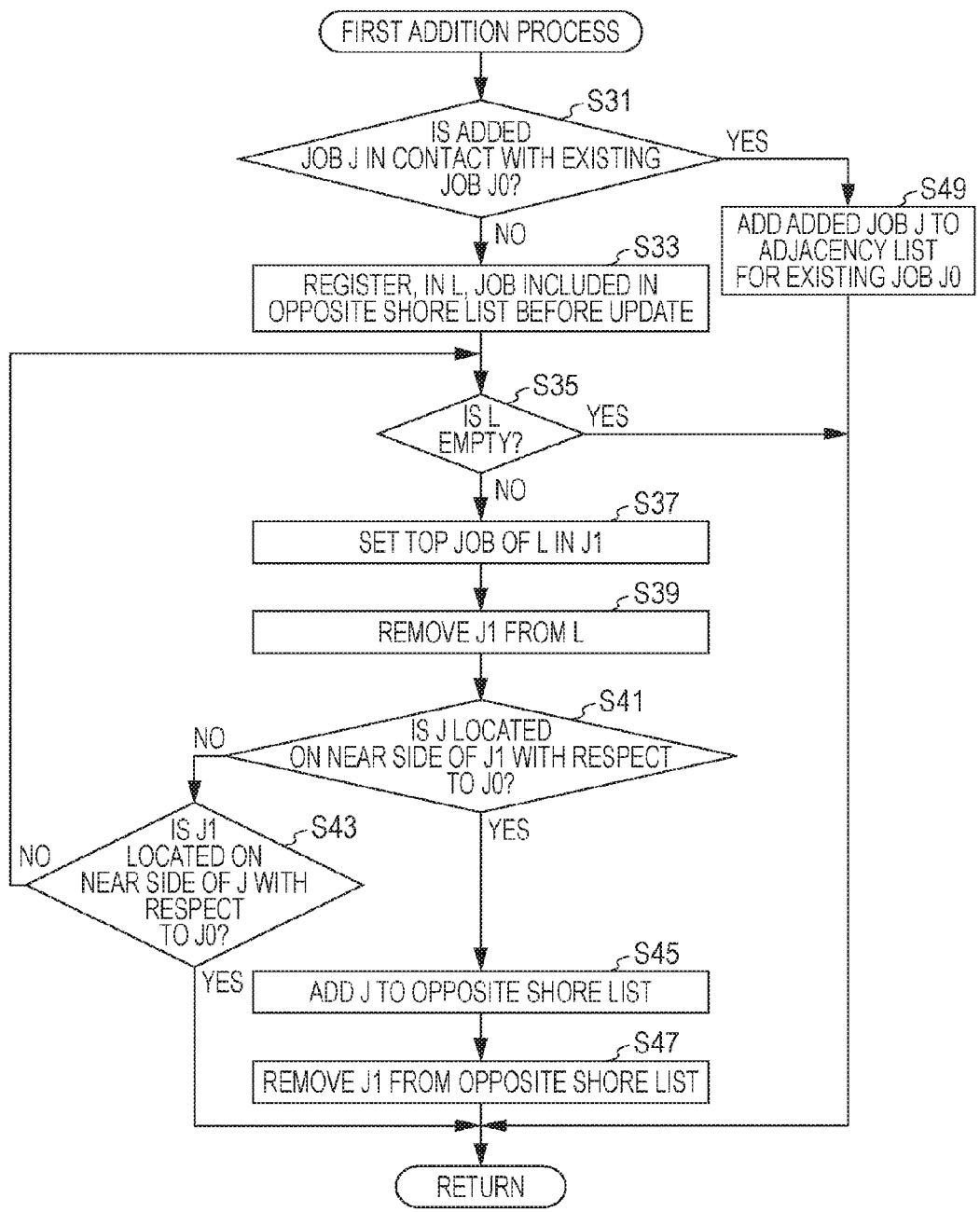
FIG. 10 is a diagram illustrating the flow of a first addition process.

Next, the first addition process is described with reference to FIG. 10.

The addition processor 3131 of the data managing section 3130 determines whether or not the added job J is in contact with an existing job J0 (in step S31). The existing job J0 is a job included in a range allotted to the slave scheduler node 310.

If the added job J is in contact with the existing job J0, the addition processor 3131 additionally registers the added job J in an adjacency list for the existing job J0 (in step S49). Then, the first addition process returns to the process from which the first addition process is called.

On the other hand, if the added job J is not in contact with the existing job J0, the addition processor 3131 registers, in an empty set L, a job included in an opposite shore list for the existing job J0 before the update of the opposite shore list (in step S33).

After that, the addition processor 3131 determines whether or not the set L is empty (in step S35). If the set L is empty, the first addition process returns to the process from which the first addition process is called.

On the other hand, if the set L is not empty, the addition processor 3131 sets the top job of the set L in a variable J1 (in step S37). In addition, the addition processor 3131 removes the job J1 from the set L (in step S39).

Then, the addition processor 3131 determines whether or not the job J is on the near side of the job J1 with respect to the existing job J0 (in step S41). Specifically, the addition processor 3131 determines whether or not the job J1 that is an opposite shore of the existing job J0 before the addition of the new job J is an opposite shore of the existing job J0 after the addition of the new job J.

If the job J is not on the near side of the job J1 with respect to the existing job J0, the addition processor 3131 determines whether or not the job J1 is on the near side of the job J with respect to the existing job J0 (in step S43). If the requirement of step S43 is satisfied, the jobs J1 and J have a positional relationship that does not cause the update of the opposite shore list, and the first addition process returns to the process from which the first addition process is called.

On the other hand, if the requirement of step S43 is not satisfied, the jobs J1 and J are not opposite to each other, the first addition process returns to step S35.

If the job J is on the near side of the job J1 with respect to the existing job J0, the addition processor 3131 adds the job J to the opposite shore list for the existing job J0 (in step S45) and removes the job J1 from the opposite shore list for the existing job J0 (in step S47). Then, the first addition process returns to the process from which the first addition process is called.

In this manner, the opposite shore list and the adjacency list are updated.

Figure 11:
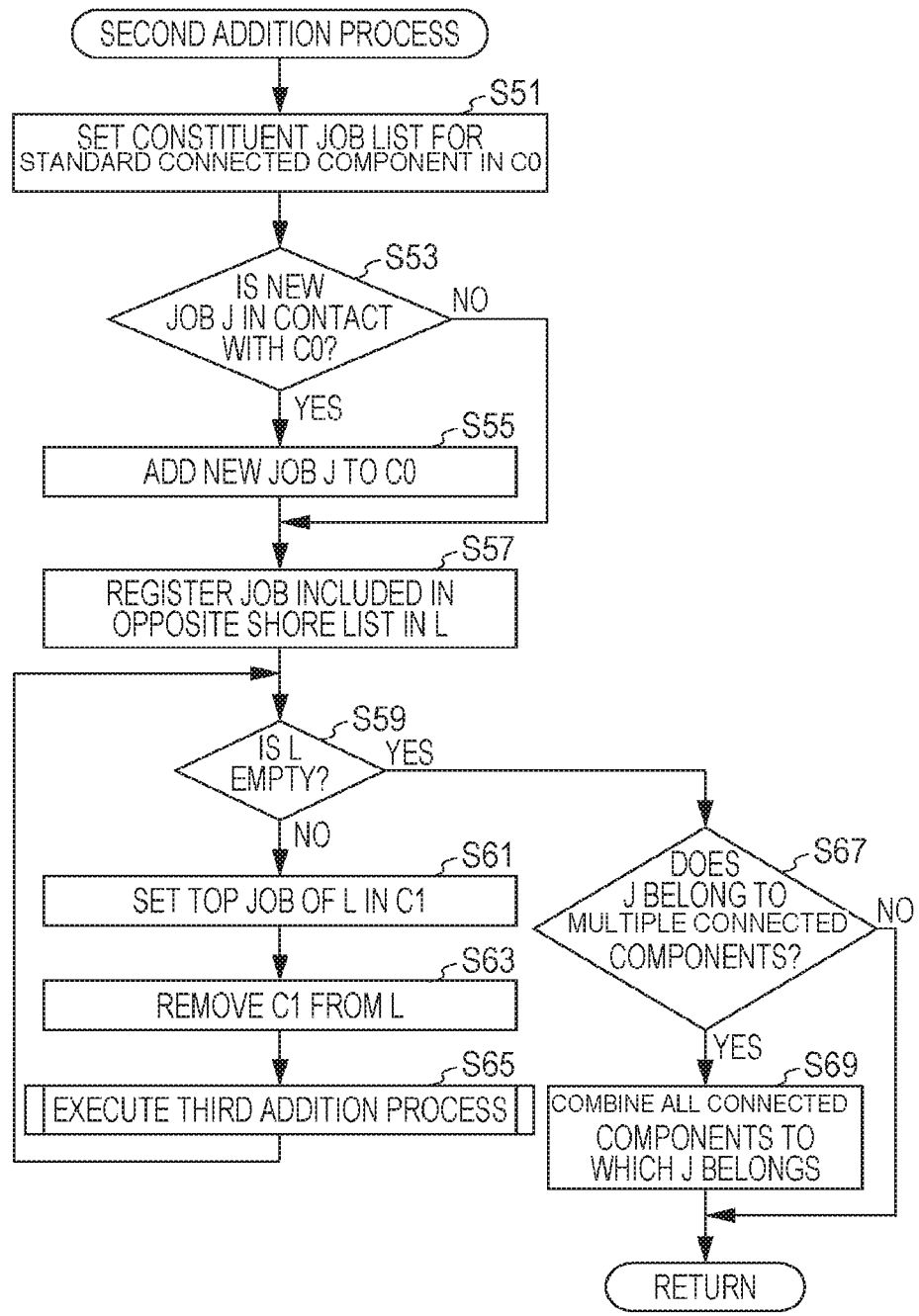
FIG. 11 is a diagram illustrating the flow of a second addition process.

Next, the second addition process is described with reference to FIG. 11.

The addition processor 3131 registers a constituent job list for a standard connected component in an empty set C0 (in step S51). For example, a connected component included in the range allotted to the slave scheduler node 310 is treated as the standard connected component. If multiple connected components are included in the range allotted to the slave scheduler node 310, a predetermined connected component is treated as the standard connected component, for example.

Then, the addition processor 3131 whether or not the new job J is in contact with any job of the set C0 (in step S53). If the requirement of step S53 is not satisfied, the second addition process proceeds to step S57. On the other hand, if the requirement of step S53 is satisfied, the addition processor 3131 adds the new job J to the set C0 (in step S55). Thus, the constituent job list for the standard connected component is updated.

Then, the addition processor 3131 registers, in the empty set L, a job included in an opposite shore list for the standard connected component (in step S57). Then, the addition processor 3131 determines whether or not the set L is empty (in step S59).

If the set L is not empty, the addition processor 3131 sets the top job of the set L in a variable C1 (in step S61). In addition, the addition processor 3131 removes the job C1 from the set L (in step S63). Then, the addition processor 3131 executes a third addition process (in step S65). The third addition process is described later with reference to FIG. 12. Then, the second addition process returns to step S59.

If the set L is empty, the addition processor 3131 determines whether or not the new job J belongs to multiple connected components (in step S67). In this case, step S67 is executed to confirm whether or not the new job J was added so as to be in contact with the multiple connected components. If the requirement of step S67 is not satisfied, the second addition process returns to the process from which the second addition process is called.

On the other hand, if the new job J belongs to the multiple connected components, the addition processor 3131 combines all the connected components to which the new job J belongs, and the addition processor 3131 updates the constituent job list (in step S69). Then, the second addition process returns to the process from which the second addition process is called.

Figure 12:
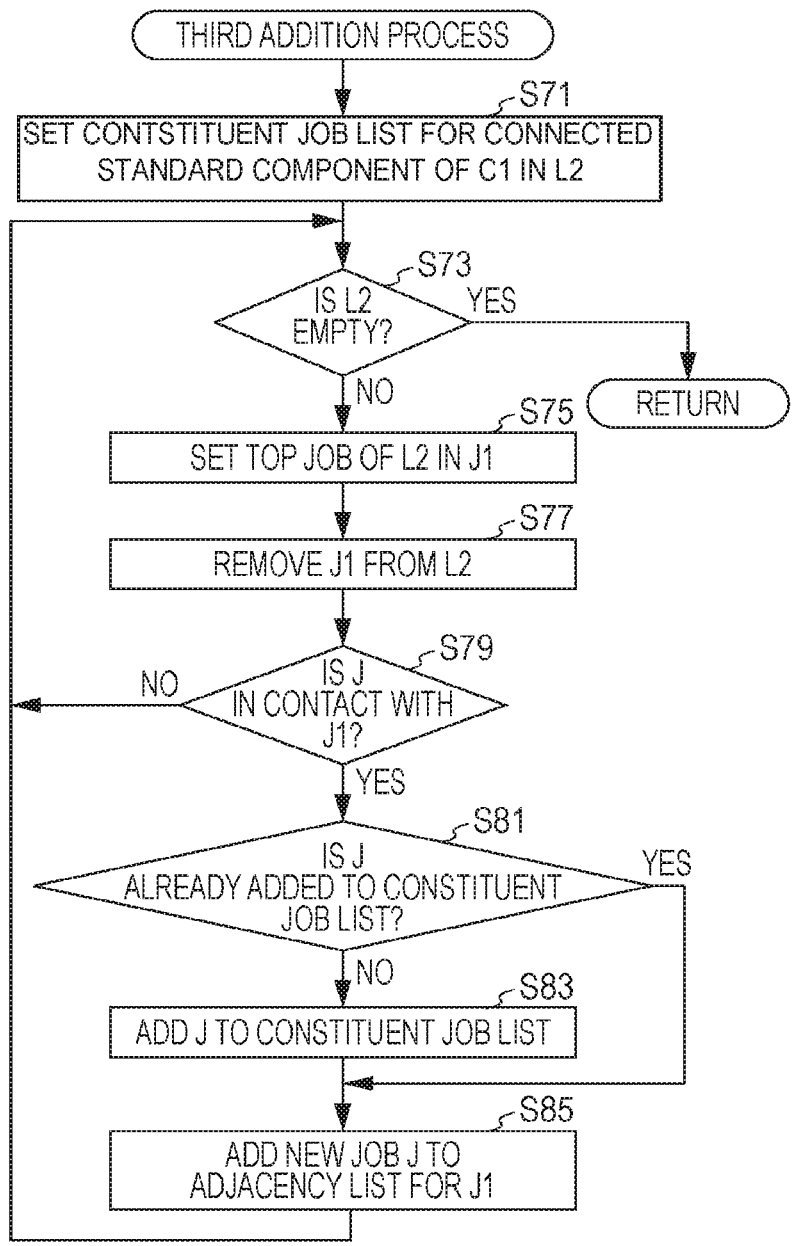
FIG. 12 is a diagram illustrating the flow of a third addition process.

Next, the third addition process is described with reference to FIG. 12.

The addition processor 3131 sets a constituent job list for a connected component of the job C1 in an empty set L2 (in step S71). Then, the addition processor 3131 determines whether or not the set L2 is empty (in step S73). If the set L is empty, the third addition process returns to the process from which the third addition process is called.

On the other hand, if the set L2 is not empty, the addition processor 3131 sets the top job of the set L2 in the variable J1 (in step S75). In addition, the addition processor 3131 removes the job J1 from the set L2 (in step S77).

Then, the addition processor 3131 determines whether or not the new job J is in contact with the job J1 (in step S79). If the new job J is not in contact with the job J1, the process returns to step S73.

On the other hand, if the new job J is in contact with the job J1, the addition processor 3131 determines whether or not the new job J is already added to the constituent job list for the connected component of the job C1 (in step S81). If the requirement of step S81 is not satisfied, the addition processor 3131 adds the new job J to the constituent job list for the connected component of the job C1 (in step S83). On the other hand, if the requirement of step S81 is satisfied, the process proceeds to step S85.

Then, if the new job J is not added to the adjacency list for the job J1, the addition processor 3131 adds the new job J to the adjacency list for the job J1 (in step S85). Then, the process returns to step S73.

Data on the connected component is updated by the execution of the aforementioned process.

Next, the deletion process is described with reference to FIGS. 13A to 15.

Figure 13A:
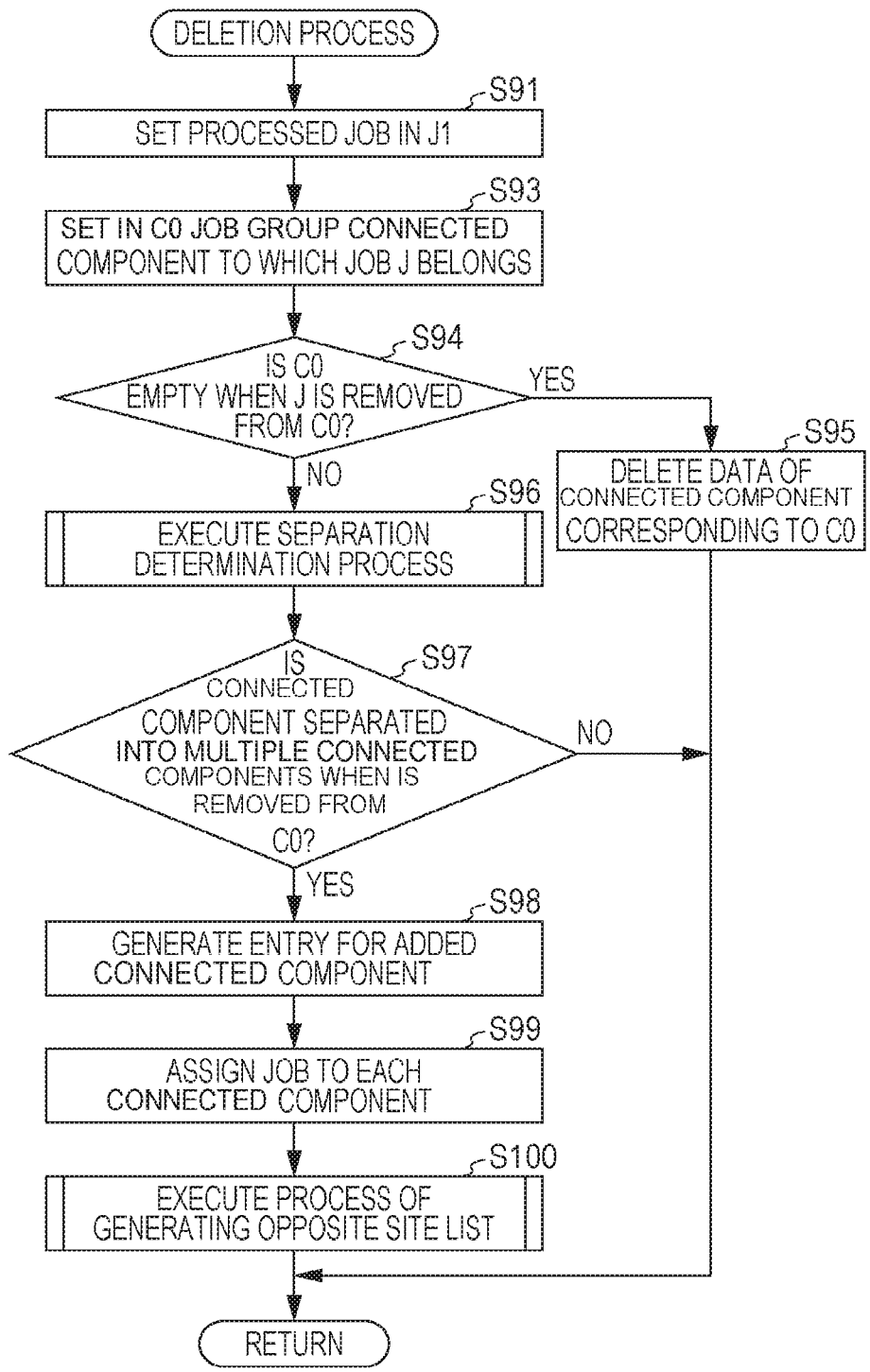
FIG. 13A is a diagram illustrating the flow of a deletion process.

The deletion processor 3132 sets a processed job in a variable J (in step S91 illustrated in FIG. 13A). In addition, the deletion processor 3132 sets, in the empty C0, a job group of a connected component to which the job J belongs (in step S93).

Then, the deletion processor 3132 determines whether or not the set C0 becomes empty after the removal of the job J from the set C0 (in step S94). Specifically, the deletion processor 3132 determines whether or not the connected component to which the job J belongs includes only the job J.

If the requirement of step S94 is satisfied, the deletion processor 3132 deletes data of the connected component corresponding to the set C0 (in step S95). If the set C0 includes only one job, the deletion process is terminated and returns to the process from which the deletion process is called.

On the other hand, if the requirement of step S94 is not satisfied, the deletion processor 3132 executes a separation determination process (in step S96). The separation determination process is described later and is a process of determining whether or not the connected component is separated into multiple connected components when the job is removed from the connected component. Then, the deletion processor 3132 determines, based on the result of the determination by the separation determination process, whether or not the connected component is separated into multiple connected components when the job J is removed from the set C0 (in step S97). If the requirement of step S97 is not satisfied, the deletion process returns to the process from which the deletion process is called.

On the other hand, if the requirement of step S97 is satisfied, the deletion processor 3132 generates, in the data storage section 3110, an entry for an added connected component (in step S98). In addition, the deletion processor 3132 assigns, to each of the connected components, a job that belongs to the set C0 and is not the job J (in step S99). After that, the deletion processor 3132 executes a process of generating an opposite shore list (in step S100). The opposite shore list generation process is described later with reference to FIGS. 14 and 15. Then, the deletion process returns to the process from which the deletion process is called.

When the connected component is separated into the multiple connected components, a process of assigning a processing element such as a slave scheduler node 310 to the added connected component or adding the processing element may be executed. The process of assigning or adding the processing element may be executed by the master scheduler node 300.

Figure 13B:
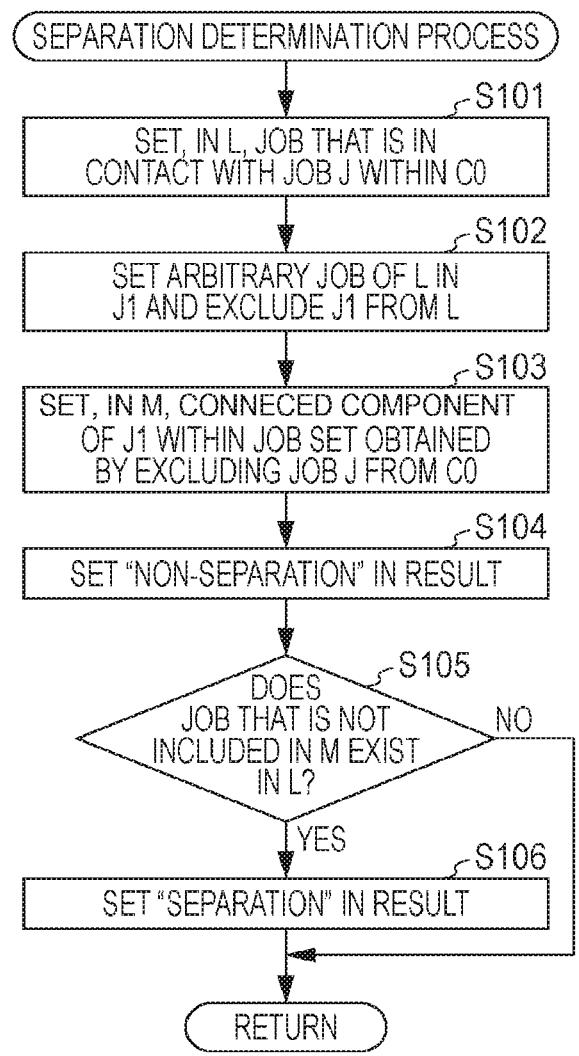
FIG. 13B is a diagram illustrating the flow of a separation determination process.

Next, the separation determination process is described with reference to FIG. 13B. First, the deletion processor 3132 sets, in the set L, a job that is in contact with the job J in the set C0 (in step S101 illustrated in FIG. 13B). Then, the deletion processor 3132 sets, in the variable J1, an arbitrary job included in the set L and excludes the job J1 from the set L (in step S102). The separation determination process is to determine "whether or not a job group that remains after the removal of the job J from the connected component C0 belongs to a single connected component". It is sufficient if this process of determining the coupling is to determine "whether or not two jobs that belong to the same connected component before the removal of the job J belong to different connected components after the removal of the job J". If a job group L that is in contact with the job J belongs to a single job group after the removal of the job J, whether or not the job J exists does not affect the whole coupling, and the coupling of "all jobs (or L) that are in contact with the job J" is checked, instead of checking of the coupling of "all jobs that belong to C0 and are not the job J". Specifically, the following steps are executed on jobs included in the set L. The deletion processor 3132 sets, in a set M, a connected component that is included in a job set obtained by excluding the job J from the set C0 and to which the job J1 belongs (in step S103). Then, the deletion processor 3132 sets "non-separation" in a determination result (in step S104) and determines whether or not a job that is not included in the set M exists in the set L (in step S105). If the requirement of step S105 is satisfied, the deletion processor 3132 sets "separation" in the determination result in order to separate the connected component into multiple connected components (in step S106). Then, the separation determination process returns to the deletion process from which the separation determination process is called. On the other hand, if the requirement of step S105 is not satisfied, the separation determination process returns to the deletion process from which the separation determination process is called.

Next, the opposite shore list generation process is described with reference to FIGS. 14 and 15.

First, the deletion processor 3132 sets the connected component before the separation in an empty set CX (in step S111). Then, the deletion processor 3132 sets the connected components after the separation in an empty set L1 (in step S113).

Then, the deletion processor 3132 whether or not the set L1 is empty (in step S115). If the set L1 is empty, the opposite shore list generation process returns to the deletion process from which the opposite shore list generation process is called.

On the other hand, if the set L1 is not empty, the deletion processor 3132 sets the top job of the set L1 in a variable C (in step S117). In addition, the deletion processor 3132 removes the job C from the set L1 (in step S119).

Then, the deletion processor 3132 sets the connected components after the separation in the empty set L2 (in step S121). In addition, the deletion processor 3132 removes the job C from the set L2 (in step S123). Furthermore, the deletion processor 3132 sets the set L2 in an empty set L3 (in step S125). Furthermore, the deletion processor 3132 registers an opposite shore list for the connected component before the separation in an empty set L5 (in step S127). Then, the opposite shore list generation process proceeds to a process illustrated in FIG. 15 through a terminal X.

Figure 15:
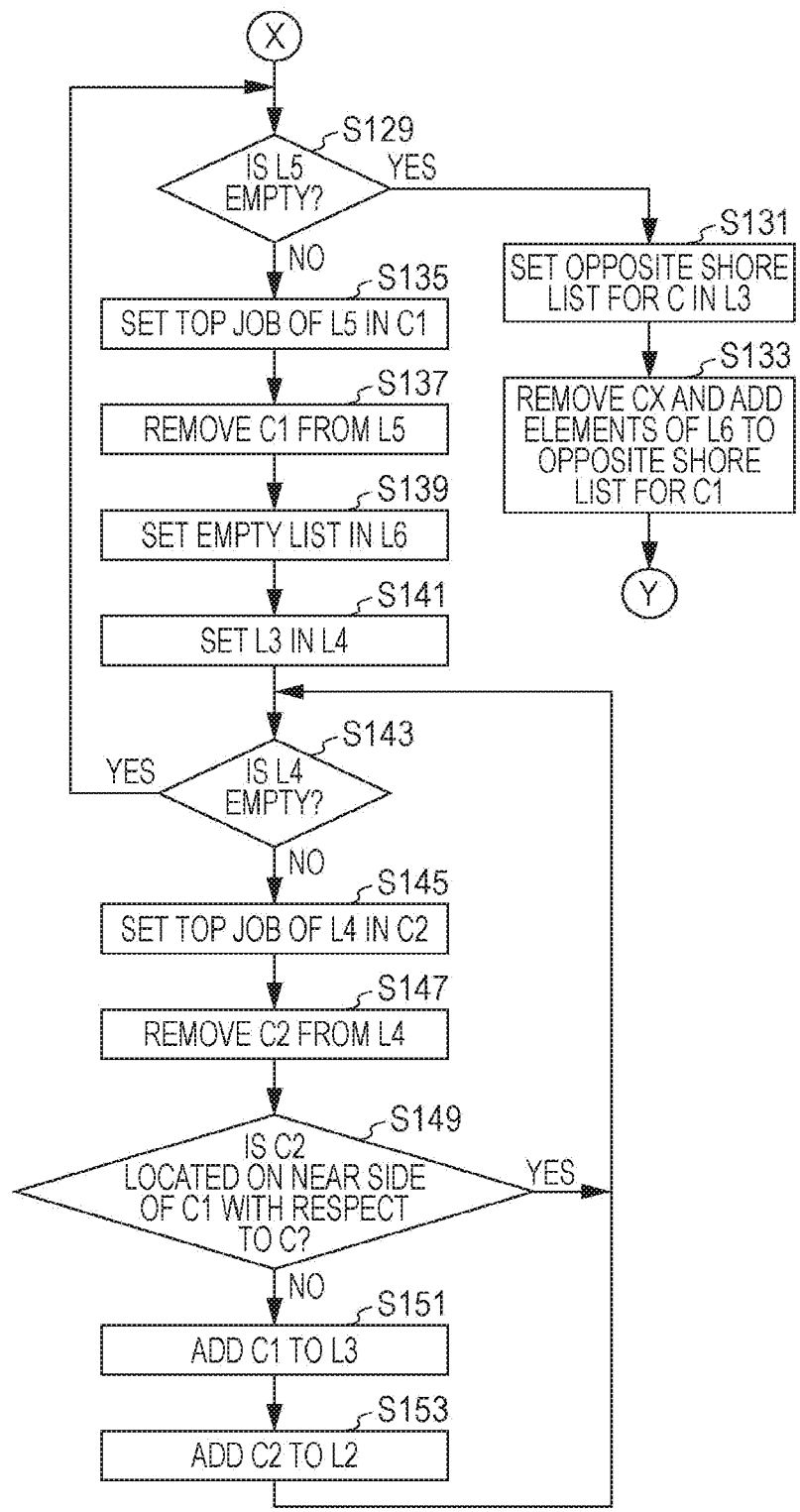
FIG. 15 is a diagram illustrating the flow of the process of updating the opposite shore list.

The process illustrated in FIG. 15 is described below. The deletion processor 3132 determines whether or not the set L5 is empty (in step S129). If the set L5 is empty, the deletion processor 3132 sets an opposite shore list for the job C in the set L3 (in step S131). In addition, the deletion processor 3132 deletes CX and adds elements of a set L6 to an opposite shore list for the job C1 (in step S133). Then, the opposite shore list generation process returns to step S115 illustrated in FIG. 14 through a terminal Y.

On the other hand, if the set L5 is not empty, the deletion processor 3132 sets the top job of the set L5 in the variable C1 (in step S135). In addition, the deletion processor 3132 removes the job C1 from the set L5 (in step S137). Furthermore, the deletion processor 3132 sets an empty list in the set L6 (in step S139). Furthermore, the deletion processor 3132 sets the set L3 in a set L4 (in step S141).

Then, the deletion processor 3132 determines whether or not the set L4 is empty (in step S143). If the set L4 is empty, the process returns to step S129. On the other hand, if the set L4 is not empty, the deletion processor 3132 sets the top job of the set L4 in a variable C2 (in step S145). In addition, the deletion processor 3132 removes the job C2 from the set L4 (in step S147).

Then, the deletion processor 3132 determines whether or not the job C2 is on the near side of the job C1 with respect to the job C (in step S149). If the requirement of step S149 is satisfied, the process returns to step S143. On the other hand, if the requirement of step S149 is not satisfied, the deletion processor 3132 adds the job C1 to the set L3 (in step S151). In addition, the deletion processor 3132 adds the job C2 to the set L2 (in step S153). Then, the process returns to step S143.

By executing the opposite shore list generation process, opposite shore lists are generated for the two separated connected components.

Next, the process (step S11) of calculating the complexity that is executed by the parameter calculator 3133 of the data managing section 3130 is described below. First, definitions of the complexity are described.

If the number of connected components is large and the shapes of the connected components are complex, fragmentation is in progress and it is therefore considered that it takes time to execute the process of searching available resources in a range of the connected components.

The complexity of the shape of a connected component $C \subset X$ is defined based on the number of links through which a vertex belonging to C and a vertex belonging to a complementary set Y for X are adjacent to each other. In the embodiment, the complexity is defined according to the following definitions 1 to 5. The definition 1: If the ratio S1 of "the number (or the number |S1| of elements of the following set S1) of vertices that are in contact with vertices belonging to C and belong to the complementary set Y for X" to "the number |C| of elements of a vertex set of C"=$\{v \in Y | \exists v1 \in C$, and v is adjacent to v1$\}$, the complexity according to the definition 1=|S1|/|C|.

The definition 2: if the ratio S2 of "the number (or the number |S2| of elements of the following set S2) of vertices that are adjacent to multiple vertices belonging to C and belong to the complementary set Y for X" to "the number |C| of the elements of the vertex set of C"={v∈Y|∃v1∈C, ∃v2∈C, v1≠v2, and v is adjacent to v1 and v2}, the complexity according to the definition 2=|S2|/|C|.

The definition 3: if the ratio S3 of "the number (or the number |S3| of elements of the following set S3) of vertices that are included in C and adjacent to vertices belonging to the complementary set Y for X" to "the number |C| of the elements of the vertex set of C"={v∈C|∃v1∈Y, and v is adjacent to v1}, the complexity according to the definition 3=|S3|/|C|.

The definition 4: if the ratio S4 of "the number |S4| of edges between vertices that are elements of C and other vertices that are elements of Y" to "the number |C| of the elements of the vertex set of C"={e∈E|∃v1∈C, ∃v2∈Y, and e is a side connecting v1 to v2}, the complexity according to the definition 4=|S4|/|C|.

The definition 5: if the ratio S5 of "the number |S4| of the edges between the vertices that are the elements of C and the other vertices that are the elements of Y" to "the number |S5| of edges of which both ends are vertices of C"={e∈E|∃v1∈C, ∃v2∈C, and e is the side connecting v1 to v2}, the complexity according to the definition 5=|S4|/|S5|.

Figure 16:
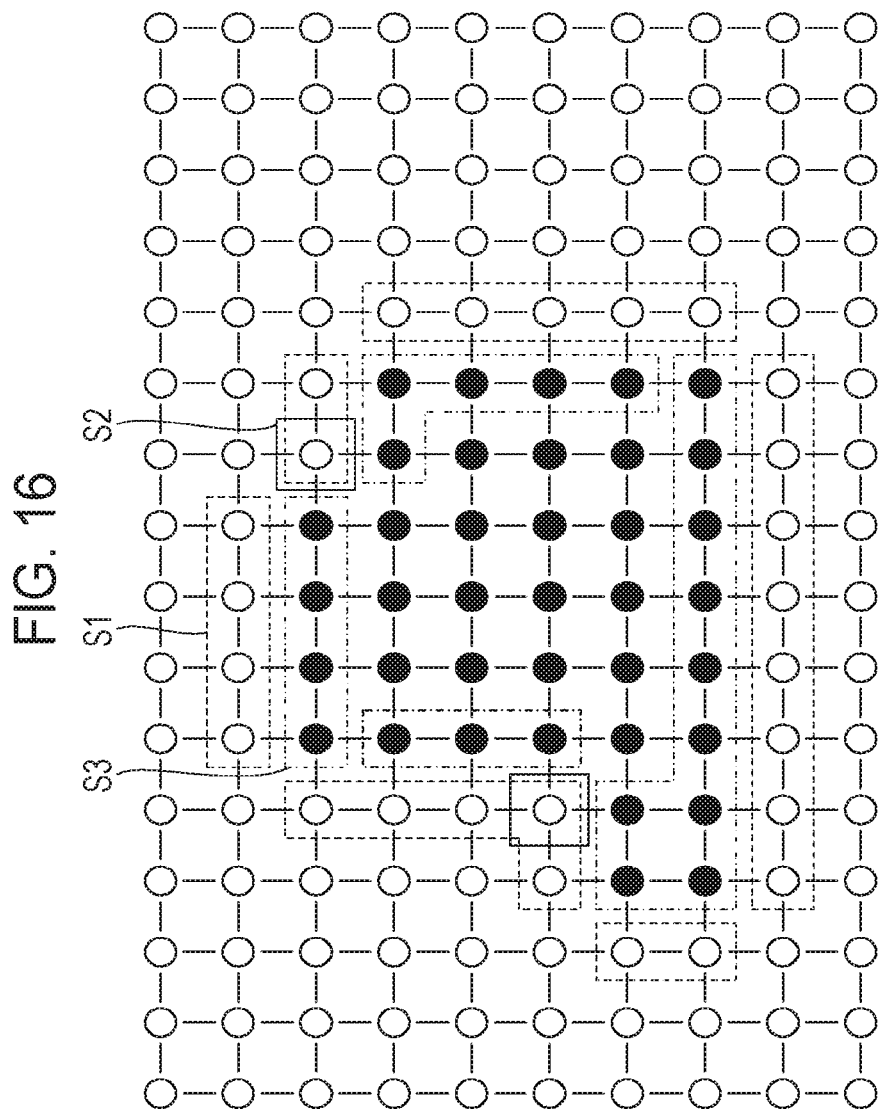
FIG. 16 is a diagram describing definitions of a complexity.

For example, it is assumed that the network topology of the parallel computer system is a mesh topology, computing nodes to which a job is assigned are indicated by black circles, and computing nodes to which a job is not assigned are indicated by white circles, as illustrated in FIG. 16. In this case, the complexity is calculated according to the aforementioned definitions 1 to 5 as follows.

According to the definition 1, |S1| is the number of white circles connected to black circles or is the number of the white circles surrounded by dotted lines. Thus, |S1|=26. Since |C| is the number of the black circles, |C|=38. Thus, the complexity according to the definition 1 or |S1|/|C|=26/38.

According to the definition 2, |S2| is the number of white circles each connected to multiple black circuits or is the number of the white circles surrounded by solid lines. Thus, |S2|=2. The complexity according to the definition 2 or |S2|/|C|=2/38.

According to the definition 3, |S3| is the number of black circles connected to white circles or is the number of the black circles surrounded by alternate long and short dashed lines. Thus, the complexity according to the definition 3 or |S3|/|C|=22/38.

Figure 17:
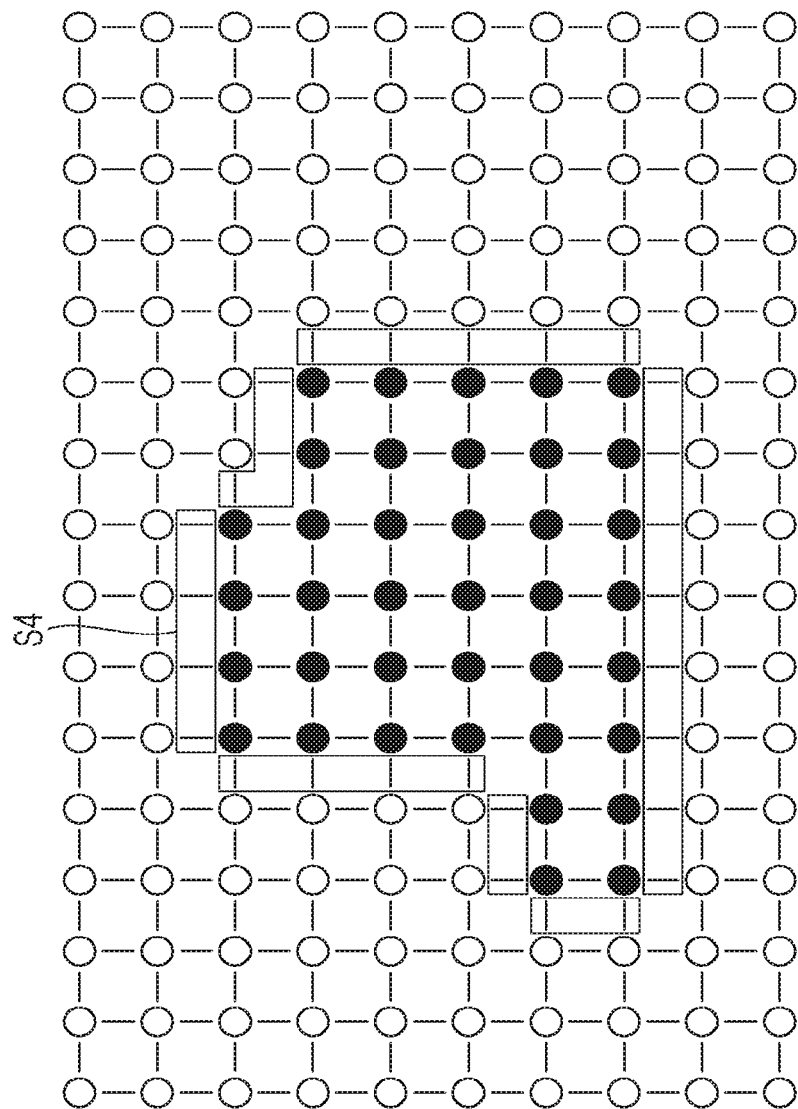
FIG. 17 is a diagram describing definitions of the complexity.

According to the definition 4, |S4| is the number of edges connecting the white circles to the black circles or is the number of the edges surrounded by solid lines illustrated in FIG. 17. Thus, the complexity according to the definition 4 or |S4|/|C|=28/38.

According to the definition 5, |S5| is the number of edges connecting black circles to black circles or is the number of all the edges within a range surrounded by S4. Thus, the complexity according to the definition 5 or |S4|/|S5|=28/62.

The complexity and S1 to S5 are calculated by a process described below based on an adjacency matrix and an incidence matrix in general. In this case, the complexity and S1 to S5 are calculated periodically or when a process of assigning a resource to a job and a process of releasing an assigned resource are executed.

Figure 18:
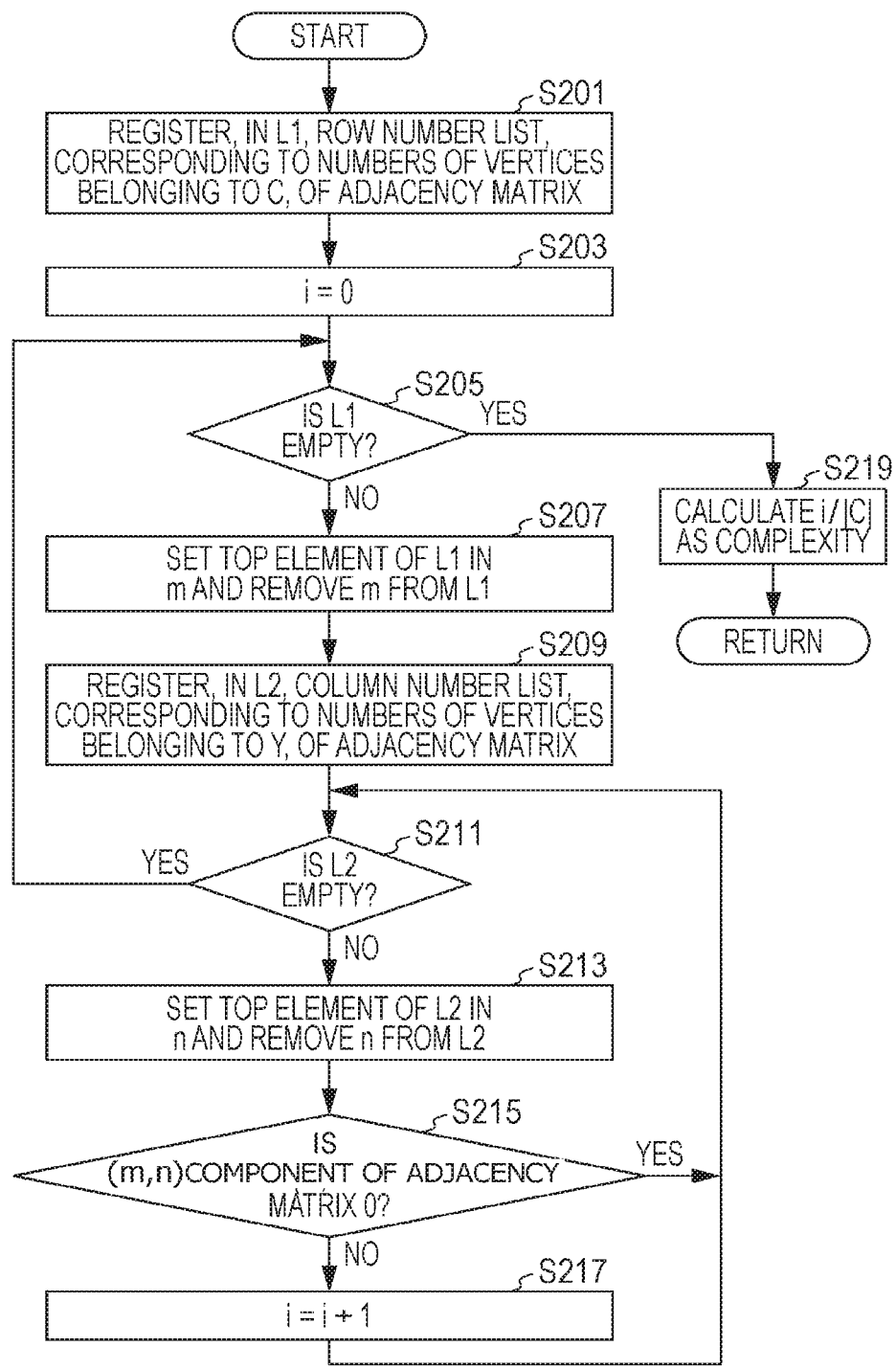
FIG. 18 is a diagram illustrating the flow of a process of calculating the complexity according to a definition 1.

First, a process of calculating the complexity according to the definition 1 is described with reference to FIG. 18.

The parameter calculator 3133 registers a row number list for the adjacency matrix in an empty set L1 (in step S201), while the row number list corresponds to numbers (numbers of computing nodes to which a job is already assigned) of vertices belonging to C.

In addition, the parameter calculator 3133 initializes a counter i to 0 (in step S203).

Furthermore, the parameter calculator 3133 determines whether or not the set L1 is empty (in step S205). If the set L1 is empty, the parameter calculator 3133 calculates, as the complexity, a value i/|C| obtained by dividing the counter i by |C| (in step S219). Then, the process is terminated.

On the other hand, if the set L1 is not empty, the parameter calculator 3133 sets the top element of the set L1 in a variable m and removes m from the set L1 (in step S207).

Furthermore, the parameter calculator 3133 registers a column number list for the adjacency matrix in the empty set L2 (in step S209), while the column number list corresponds to numbers (numbers of computing nodes to which a job is not assigned) of vertices belonging to Y.

Then, the parameter calculator 3133 determines whether or not the set L2 is empty (in step S211). If the set L2 is empty, the process returns to step S205.

On the other hand, if the set L2 is not empty, the parameter calculator 3133 sets the top element of the set L2 in a variable n and removes n from the set L2 (in step S213).

Then, the parameter calculator 3133 determines whether or not components (m, n) of the adjacency matrix are 0 (in step S215). If the (m, n) components of the adjacency matrix are 0, the process proceeds to step S211.

On the other hand, if at least any of the (m, n) components of the adjacency matrix is not 0, the parameter calculator 3133 increments i by 1 (in step S217). Then, the process proceeds to step S211.

The complexity according to the definition 1 is calculated by the aforementioned process.

Figure 19:
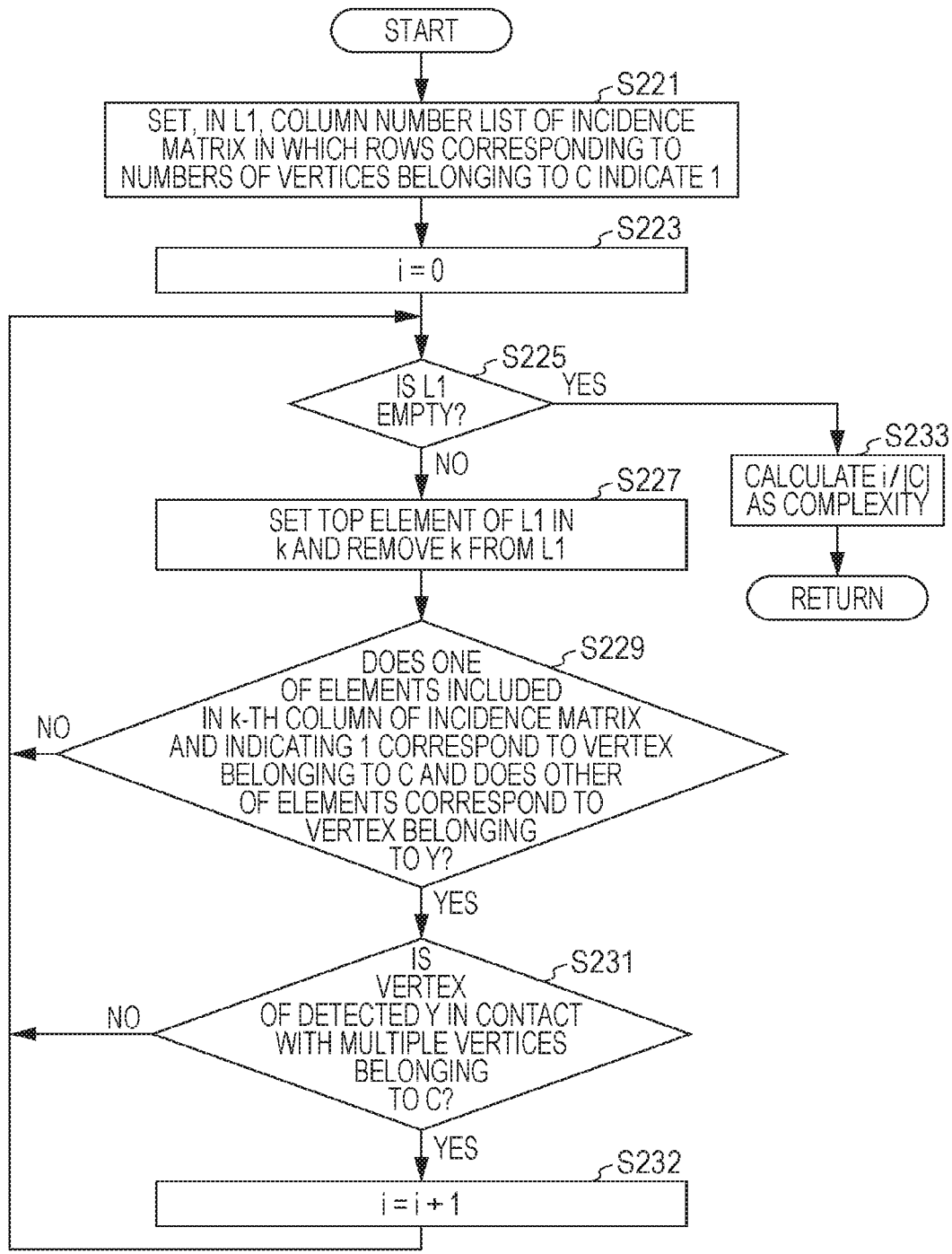
FIG. 19 is a diagram illustrating the flow of a process of calculating the complexity according to a definition 2.

Next, a process of calculating the complexity according to the definition 2 is described with reference to FIG. 19.

The parameter calculator 3133 sets, in the empty set L1, a column number list for the incidence matrix in which rows corresponding to numbers (numbers of computing nodes to which a job is already assigned) of vertices belonging to C indicate 1 (in step S221).

The parameter calculator 3133 initializes the counter i to 0 (in step S223).

In addition, the parameter calculator 3133 determines whether or not the set L1 is empty (in step S225). If the set L1 is empty, the parameter calculator 3133 calculates i/|C| as the complexity (in step S233). Then, the process is terminated.

On the other hand, if the set L1 is not empty, the parameter calculator 3133 sets the top element of the set L1 in a variable k and removes k from the set L1 (in step S227).

In addition, the parameter calculator 3133 determines whether or not one of elements included in the k-th column of the incidence matrix and indicating 1 corresponds to a vertex belonging to C and whether or not the other of the elements corresponds to a vertex belonging to Y (in step S229). If at least any of the requirements of step S229 is not satisfied, the process returns to step S225. On the other hand, if the requirements of step S229 are satisfied, the parameter calculator 3133 determines whether or not the vertex of Y that is detected in step S229 is adjacent to multiple vertices belonging to C (in step S231). If the requirement of step S231 is not satisfied, the process returns to step S225.

On the other hand, if the requirement of step S231 is satisfied, the parameter calculator 3133 increments i by 1 (in step S232). Then, the process returns to step S225.

The complexity according to the definition 2 is calculated by the aforementioned process.

Figure 20:
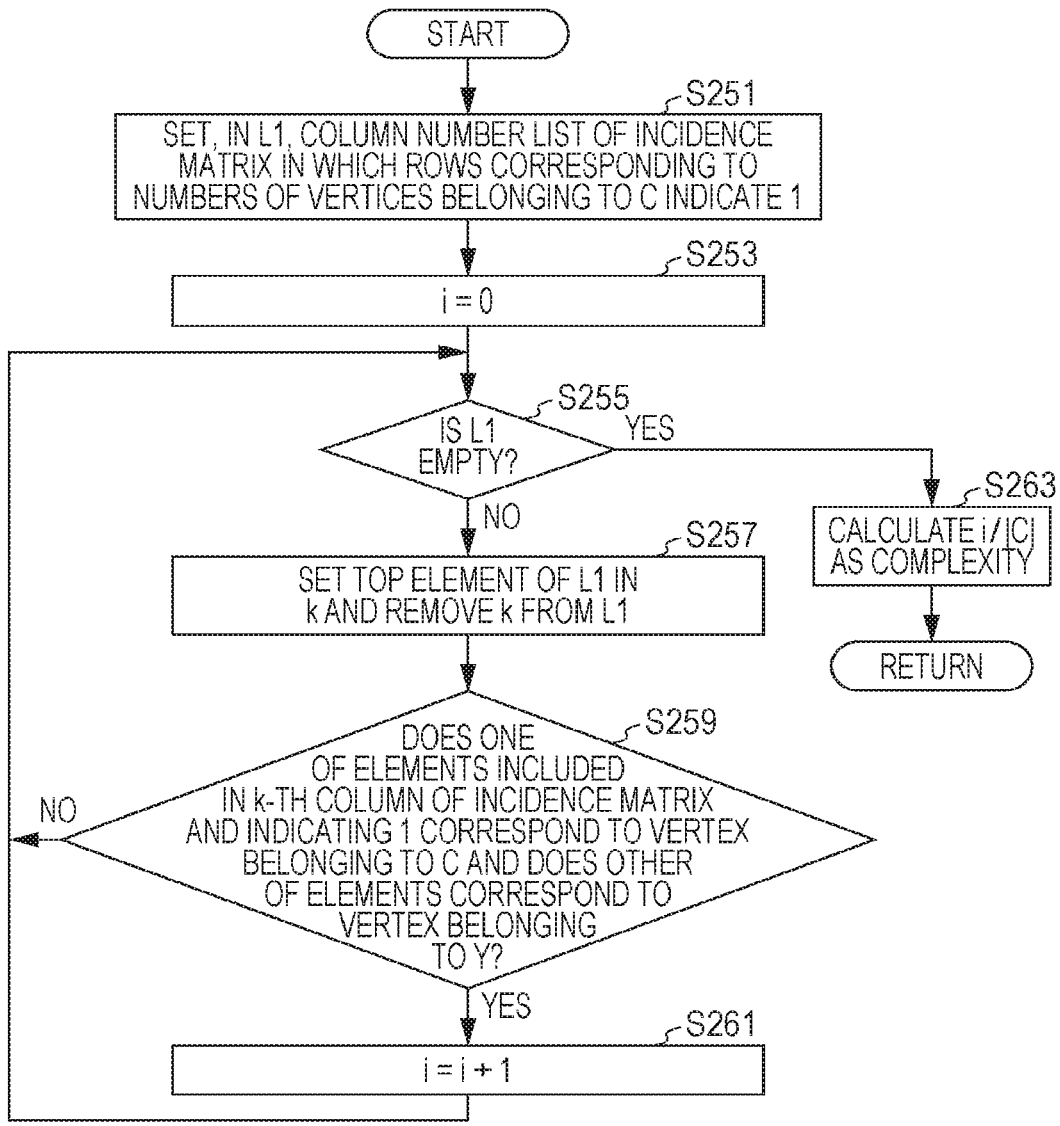
FIG. 20 is a diagram illustrating the flow of a process of calculating the complexity according to a definition 3.

Next, a process of calculating the complexity according to the definition 3 is described with reference to FIG. 20.

The parameter calculator 3133 sets, in the empty set L1, the column number list for the incidence matrix in which the rows corresponding to the numbers of the vertices belonging to C indicate 1 (in step S251). In addition, the parameter calculator 3133 initializes the counter i to 0 (in step S253).

Then, the parameter calculator 3133 determines whether or not the set L1 is empty (in step S255). If the set L1 is empty, the parameter calculator 3133 calculates i/C as the complexity (in step S263).

On the other hand, if the set L1 is not empty, the parameter calculator 3133 sets the top element of the set L1 in the variable k and removes k from the set L1 (in step S257).

Then, the parameter calculator 3133 determines whether or not one of the elements included in the k-th column of the incidence matrix and indicating 1 corresponds to a vertex belonging to C and whether or not the other of the elements corresponds to a vertex belonging to Y (in step S259). If the requirements of S259 are satisfied, the parameter calculator 3133 increments i by 1 (in step S261). Then, the process returns to step S255. On the other hand, if at least any of the requirements of S259 is not satisfied, the process returns to step S255.

The complexity according to the definition 3 is calculated by the aforementioned process.

When the incidence matrix and the adjacency matrix are used in the aforementioned manner, the complexity may be accurately calculated. However, approximate calculation may be executed to calculate an approximate value of the complexity by the Monte Carlo method using a uniform random number. For example, a positive integer that is equal to or larger than 1 and equal to or smaller than |C| may be randomly generated at the same rate a predetermined number of times, and rates at which corresponding vertices belong to S1, S2, S3, and the like may be used as the approximate value of the complexity |S1|/|C|, |S2|/|C|, |S3|/|C|, or the like.

Figure 21:
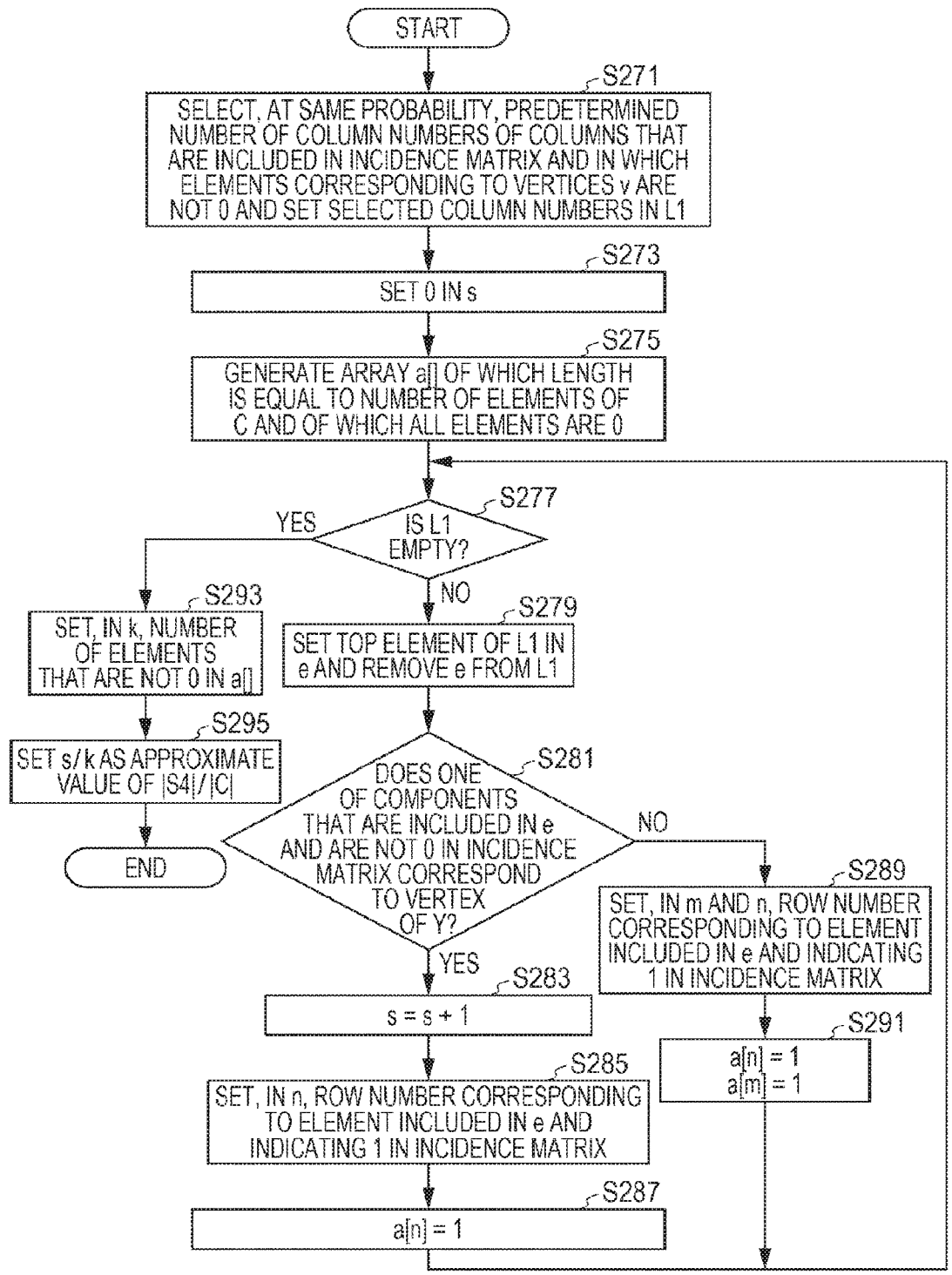
FIG. 21 is a diagram illustrating the flow of a process of calculating the complexity according to a definition 4.

An example of a process of calculating the complexity according to the definition 4 using a random number is described with reference to FIG. 21. First, the parameter calculator 3133 selects, at the same probability, a predetermined number of column numbers of columns that are included in the incidence matrix and in which elements corresponding to vertices v (for example, vertices belonging to C) are not 0, and sets the selected column numbers in the empty set L1 (in step S271).

In addition, the parameter calculator 3133 initializes a counter s to 0 (in step S273).

Furthermore, the parameter calculator 3133 generates an array a[ ] of which the length is equal to the number of elements of C and of which all elements are 0 (in step S275).

Then, the parameter calculator 3133 determines whether or not the set L1 is empty (in step S277). If the set L1 is not empty, the parameter calculator 3133 sets the top element of the set L1 in e and removes e from the set L1 (in step S279).

In addition, the parameter calculator 3133 determines whether or not one of components that are included in e and are not 0 in the incidence matrix is a vertex of Y (in step S281).

If the requirement of step S281 is satisfied, the parameter calculator 3133 increments s by 1 (in step S283). In addition, the parameter calculator 3133 sets, in n, a row number corresponding to an element included in e and indicating 1 in the incidence matrix (in step S285). Then, the parameter calculator 3133 sets a[n] to 1 (in step S287). The process returns to step S277.

On the other hand, if the requirement of step S281 is not satisfied, the parameter calculator 3133 sets, in m and n, a row number corresponding to an element indicating 1 and included in e in the incidence matrix (in step S289). Then, the parameter calculator 3133 sets a[n] to 1 and sets a[m] to 1 (in step S291). Then, the process returns to step S277.

In addition, if the parameter calculator 3133 determines that the set L1 is empty in step S277, the parameter calculator 3133 sets, in the variable k, the number of elements that do not indicate 0 in a[ ] (in step S293). Then, the parameter calculator 3133 sets s/k as an approximate value of |S4|/|C| (in step S295).

The approximate value of the complexity according to the definition 4 is obtained by the aforementioned process.

Figure 22:
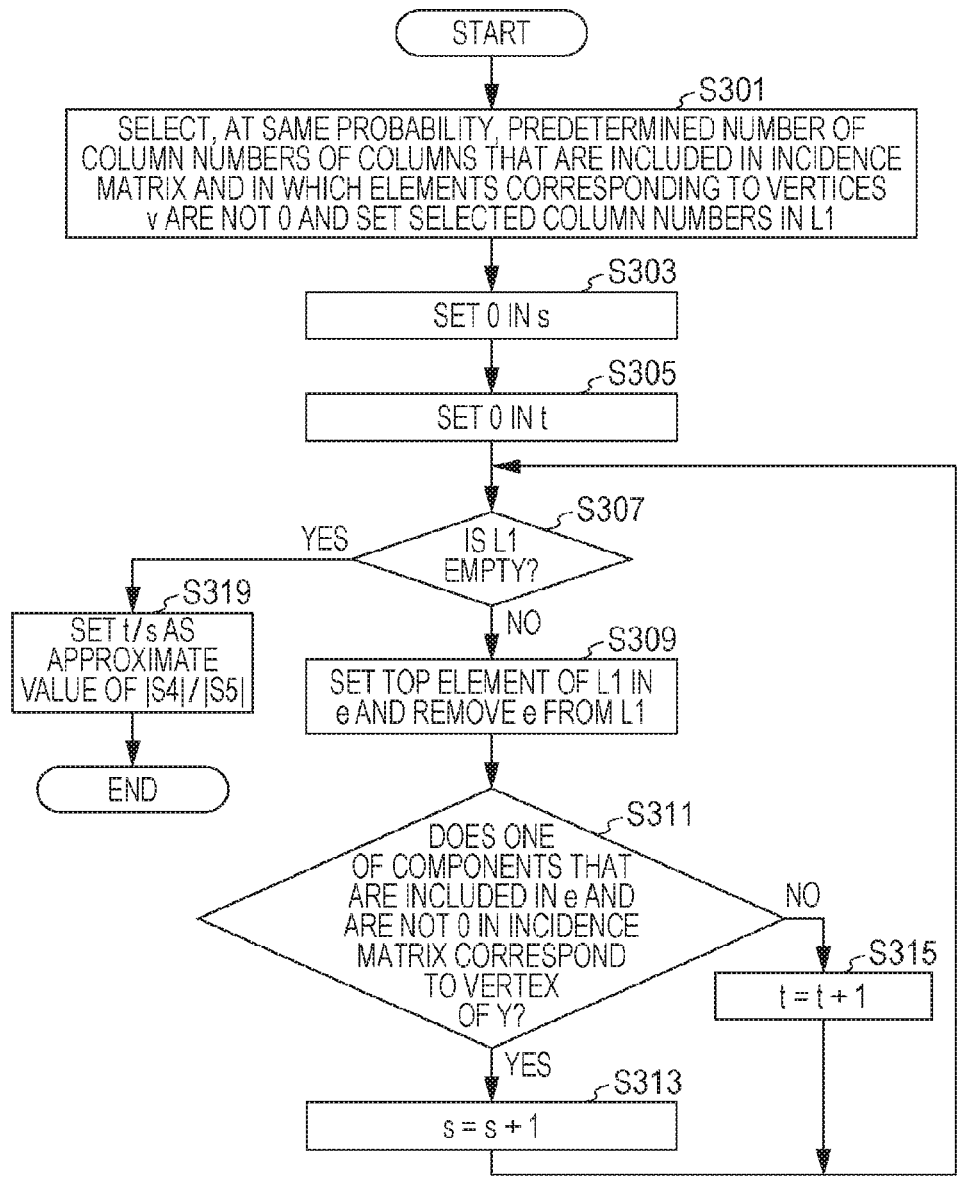
FIG. 22 is a diagram illustrating the flow of a process of calculating the complexity according to a definition 5.

In addition, an example of a process of calculating the complexity according to the definition 5 using a random number is described with reference to FIG. 22.

First, the parameter calculator 3133 selects, at the same probability, a predetermined number of column numbers of columns that are included in the incidence matrix and in which elements corresponding to vertices v (for example, vertices belonging to C) are not 0, and sets the selected column numbers in the empty set L1 (in step S301).

In addition, the parameter calculator 3133 initializes the counter s to 0 (in step S303). Furthermore, the parameter calculator 3133 initializes a counter t to 0 (in step S305).

Then, the parameter calculator 3133 determines whether or not the set L1 is empty (in step S307). If the set L1 is not empty, the parameter calculator 3133 sets the top element of the set L1 in e and removes e from the set L1 (in step S309).

Then, the parameter calculator 3133 determines whether or not one of components that are included in e and are not 0 in the incidence matrix is a vertex of Y (in step S311). If the requirement of step S311 is satisfied, the parameter calculator 3133 increments s by 1 (in step S313). Then, the process proceeds to step S307. On the other hand, if the requirement of step S311 is not satisfied, the parameter calculator 3133 increments t by 1 (in step S315). Then, the process returns to step S307.

If the parameter calculator 3133 determines that the set L1 is empty in step S307, the parameter calculator 3133 sets t/s as an approximate value of |S4|/|S5| (in step S319).

The complexity is calculated by executing any of the aforementioned processes.

The complexity is associated with a connected component ID and transmitted by the slave scheduler node 310 to the master scheduler node 300, for example. The master scheduler node 300 stores the complexity associated with the connected component ID in the data storage section 3010.

After that, when the slave scheduler node 310 executes the search process described later, the slave scheduler node 310 associates the complexity with the connected component ID of the connected component used as a standard for the search and transmits, to the master scheduler node 300, the number of connected components, data indicating whether or not a computing node 200 to which a job is to be assigned was detected, and data of a process time (an example of a load evaluation index). The master scheduler node 300 associates the complexity with the connected component ID and stores, in the data storage section 3010, the number of the connected components, the data indicating whether or not the computing node 200 to which the job is to be assigned was detected, and the data of the process time. The slave scheduler node 310 may transmit, to the master scheduler node 300, the number of processing elements that executed the search process, and the master scheduler node 300 may store the number of the processing elements.

When a certain amount of data received from the slave scheduler node 310 is accumulated in the data storage section 3010, the equation estimator 3041 included in the data managing section 3040 of the master scheduler node 300 generates an estimation equation for the process time.

As a first method, the equation estimator 3041 generates an estimated equation in which the number of connected components included in a certain range and corresponding to computing nodes to which a job is already assigned, and the complexity (according to at least one of the five definitions) of the connected components, are treated as explanatory variables, and the process time is treated as an explained variable, or the equation estimator 3041 generates a regression equation by multi-regression analysis or Kalman filtering, for example. For example, if three connected components exist in the certain range, the sum of three complexities is used as the complexity.

As the explanatory variables, arbitrary monotonically increasing functions (exponentials, positive exponential power functions, logs, or the like) for the number of connected components and the complexity of the connected components may be used instead of the number of the connected components and the complexity of the connected components. In addition, at least any of the monotonically increasing functions may be used as well as the number of the connected components and the complexity of the connected components.

For the process time, an appropriate performance model may be prepared and a value obtained by simulation may be used.

The equation estimator 3041 causes data of the estimated equation generated in the aforementioned manner to be stored in the data storage section 3010.

As a second method, a success probability at which a computing node 200 to which a job is to be assigned is detected is estimated. This is due to the fact that it is effective to assign many computing nodes 200 to an allotted range in which an estimated success probability is high in some cases.

In the second method, Bayesian inference is carried out to estimate the success probability. As a method for Bayesian inference, a method of calculating the success probability while treating all explanatory variables as independent variables is used, for example. As the explanatory variables, the explanatory variables described in the first method may be used. The explanatory variables may be different in specific forms from the explanatory variables described in the first method. For parameter transformation for Bayesian inference, various methods such as a kernel method are known, and any of the methods is used. Data to be used to estimate the success probability is stored in the data storage section 3010. In some cases, multi-regression analysis may be executed.

In the second method, data to be used to estimate the process time based on the estimated success probability and Kalman filtering is generated and stored in the data storage section 3010.

Next, main operations of the master scheduler node 300 are described.

Figure 23:
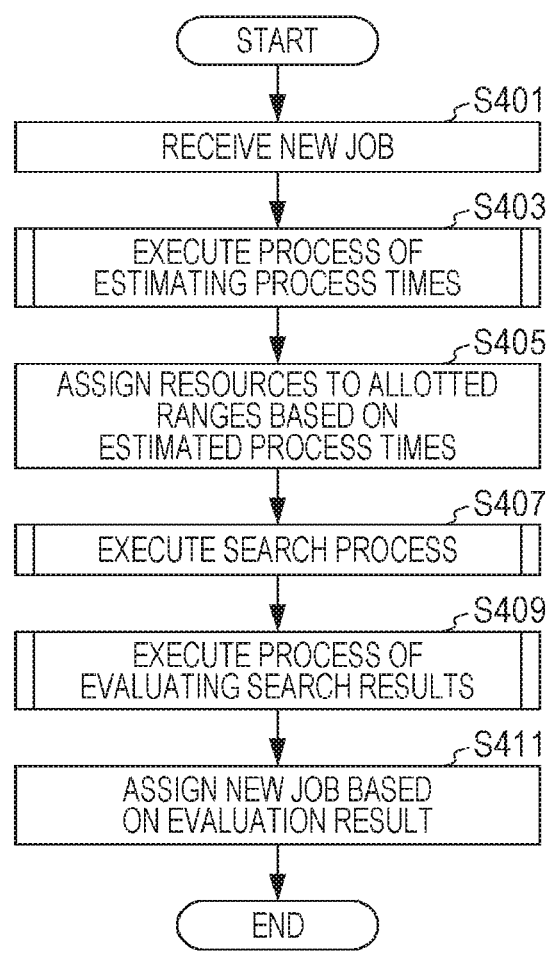
FIG. 23 is a diagram illustrating the flow of a main process to be executed by the master scheduler node.

FIG. 23 illustrates the flow of a main process to be executed by the master scheduler node 300.

The search controller 3020 of the master scheduler node 300 receives a new job from another terminal connected to the network 20 or the like (in step S401). Data of the new job includes a job ID, a user ID, data (including time) of the size (the number of computing nodes 200 to be used in dimensions if the number of the dimensions is N (N is an integer)) of a computing resource and the like. From a queue for the new job, a job to be currently processed may be read.

Then, the search controller 3020 executes a process of estimating process times (in step S403). The process is described later with reference to FIG. 24. The process times are estimated for defined allotted ranges (for example, the process times are estimated for connected components, but the allotted ranges may include multiple connected components) using data that is the aforementioned estimated equation for the process times and is used to estimate the process times.

After that, the search controller 3020 determines the assignment of resources in order to execute the search process on the allotted ranges based on the estimated process times (in step S405). For example, the resources are assigned based on the ratios of the estimated process times. Specifically, if the number of the allotted ranges is 4 and the ratios of the estimated process times are 10:5:3:1, 10 resources are assigned to the first allotted range, 5 resources are assigned to the second allotted range, 3 resources are assigned to the third allotted range, and 1 resource is assigned to the fourth allotted range. Slave scheduler nodes 310 are basically assigned as the resources, but computing nodes 200 to which a job is not assigned may be assigned.

Then, the search controller 3020 causes, based on the results of the resource assignment, a slave scheduler node 310 (including a computing node 200 in some cases) to execute the search process (in step S407). The search process is described later with reference to FIGS. 25 and 26. For example, the search controller 3020 determines, for each of the allotted ranges, whether or not a computing node 200 to which a new job is to be assigned exists in a range from a standard point of a certain connected component to another connected component that is an opposite shore of the certain connected component. The slave scheduler node 310 transmits the results of the search process to the master scheduler node 300. If the computing node 200 to which the new job is to be assigned is detected, the search results include data indicating the success of the detection, a process time, and data identifying the computing node 200 to which the new job is to be assigned, for example. If the computing node 200 to which the new job is to be assigned is not detected, the search results include data indicating a failure of the detection and the process time.

Then, the job assignment processor 3030 executes a process of evaluating the search results (in step S409). The process of evaluating the search results is described later with reference to FIGS. 27 to 30. For example, the following process is executed: a process of determining, based on the process of evaluating the search results based on a policy for the assignment of the new job, whether or not any of computing nodes 200 to which the new job is to be assigned is used.

After that, the job assignment processor 3030 executes, based on the result of the evaluation, a process of assigning the new job to the computing node 200 (in step S411). Specifically, the job assignment processor 3030 instructs, based on the evaluation result, the computing node 200 identified based on the evaluation result to execute the new job.

After that, when a result of updating the complexity described above is received, the estimated equation for the process times and the like may be updated.

By executing the aforementioned process, the parallel search process is efficiently executed in the whole system and the new job is assigned to the appropriate computing node 200.

Figure 24:
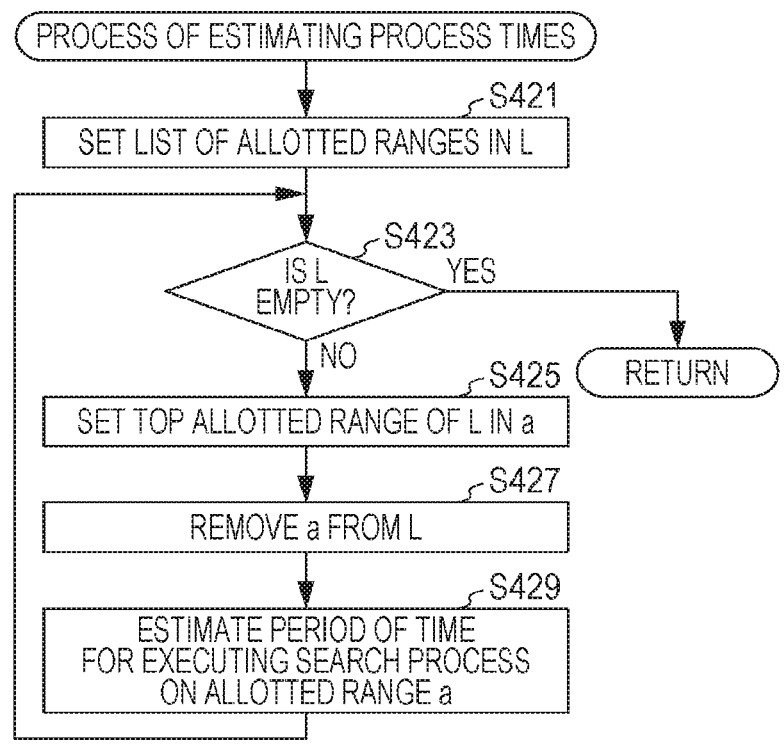
FIG. 24 is a diagram illustrating the flow of a process of estimating process times.

Next, an example of the process (step S403) of estimating the process times is described with reference to FIG. 24.

The search controller 3020 sets a list of the allotted ranges in the empty set L (in step S421). Then, the search controller 3020 determines whether or not the set L is empty (in step S423). If the set L is empty, the process of estimating the process times returns to the process from which the process of estimating the process times is called.

If the set L is not empty, the search controller 3020 sets the top allotted range of the set L in a variable a (in step S425). In addition, the search controller 3020 removes the variable a from the set L (in step S427).

Then, the search controller 3020 uses, for example, data stored in the data storage section 3010 and indicating the estimated equation and data of the allotted range a to estimate a period of time (or process time) for executing the search process on the allotted range a (in step S429). Specifically, data of a complexity for the allotted range a and data of the number of connected components included in the allotted range a are stored in the data storage section 3010. The process time is calculated by substituting the data into the estimated equation and stored in the data storage section 3010, for example. Then, the process returns to step S423.

By executing the aforementioned process, the process times are estimated for the allotted ranges.

Figure 25:
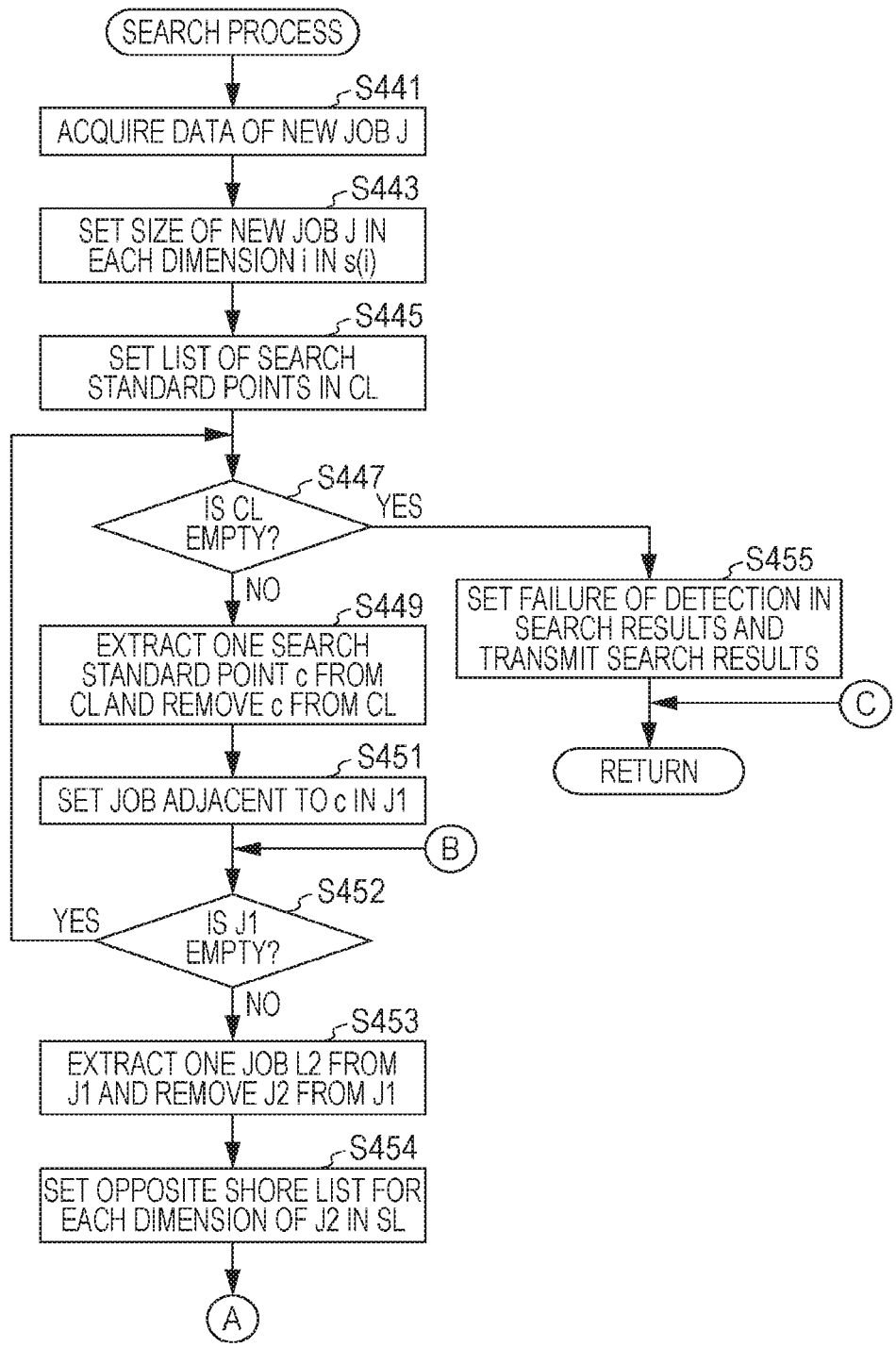
FIG. 25 is a diagram illustrating the flow of a search process.

Next, an example of the search process (step S407) to be executed by the slave scheduler node 310 is described with reference to FIGS. 25 and 26. The process is executed on the assumption that a graph of an Nth-dimensional mesh or torus network is used. The assumption, however, is described in order to clarify a feature in which a process time is reduced by using an opposite shore list.

First, the search processor 3120 acquires data of a new job J (in step S441). As described above, the data of the new job J includes a job ID, a user ID, the size of a computing resource, and the like and is acquired from the master scheduler node 300.

Then, the search processor 3120 sets the size of the new job J in each dimension i in a variable $s(i)$ (i is equal to or larger than 1 and equal to or smaller than N) (in step S443). In addition, the search processor 3120 sets, in an empty set CL, a list of search standard points defined for a range allotted to the slave scheduler node 310 (in step S445). For example, if multiple connected components exist in the allotted range, at least one search standard point is set for each of the connected components.

Then, the search processor 3120 determines whether or not the set CL is empty (in step S447). If the set CL is empty, the search processor 3120 sets a failure of detection in search results and transmits the search results to the master scheduler node 300 (in step S455). Then, the search process returns to the process from which the search process is called. The search processor 3120 may transmit the search results and a process time to the master scheduler node 300.

If the set CL is not empty, the search processor 3120 extracts a single search standard point c from the set CL and removes c from the set CL (in step S449). Then, the search processor 3120 sets a job adjacent to c in an empty set J1 (in step S451). For example, a list of adjacent jobs set for a job including c is set in the set J1. The number of adjacent jobs set for the job including c may be two or more. If an adjacent job does not exist, the search processor 3120 sets a job for c in the set J1.

Then, the search processor 3120 determines whether or not the set J1 is empty (in step S452). If the set J1 is empty, the process returns to step S447. If the set J1 is not empty, the search processor 3120 extracts a single job J2 from the set J1 and removes the job J2 from the set J1 (in step S453).

In addition, the search processor 3120 sets an opposite shore list for each dimension of the job J2 in the set SL (in step S454). Then, the process proceeds to a process illustrated in FIG. 26 through a terminal A.

Figure 26:
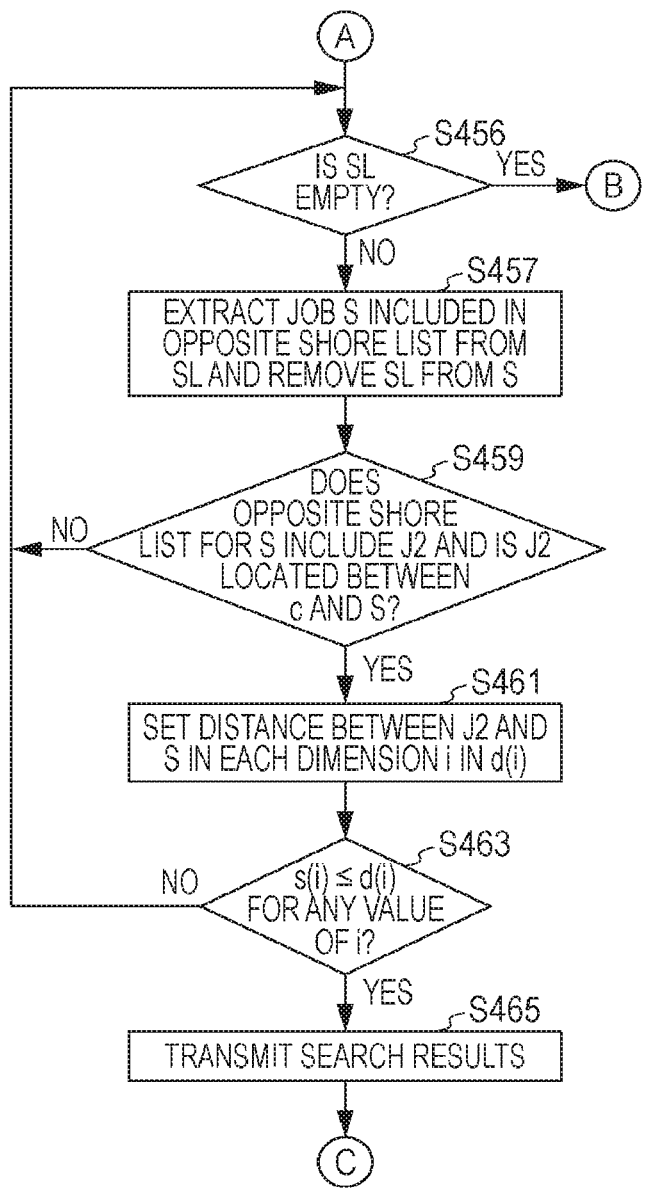
FIG. 26 is a diagram illustrating the flow of the search process.

The process illustrated in FIG. 26 is described below. The search processor 3120 determines whether or not the set SL is empty (in step S456). If the set SL is empty, the process returns to step S452 through a terminal B.

If the set SL is not empty, the search processor 3120 extracts a single job S included in the opposite shore list from the set SL and removes the job S from the set SL (in step S457).

Then, the search processor 3120 determines whether or not an opposite shore list for the job S includes the job J2 and whether or not the job J2 is between c and the job S (in step S459). Step S459 is executed to confirm whether or not positional relationships between the search standard point c, the adjacent job J2, and the job S are appropriate for the search of available resources between the adjacent job J2 and the job S with respect to the job S that is an opposite shore of a connected component including a job related to the search standard point c. If at least any of the requirements of step S459 is not satisfied, the process returns to step S456.

If the requirements of step S459 are satisfied, the search processor 3120 sets, in $d(i)$, distances between the job J2 and the job S in dimensions i (i is an integer equal to or larger than 1 and equal to or smaller than N) (in step S461). The distances are the numbers of computing nodes 200 located between the job J2 and the job S, for example.

Then, the search processor 3120 determines whether or not $s(i) \leq d(i)$ for any value of i (in step S463). The search processor 3120 may determine whether or not $s(i) \leq d(i)$ for all values of i. If the requirement of step S463 is not satisfied, the process proceeds to step S456.

If the requirement of step S463 is satisfied, the search processor 3120 transmits the search results to the master scheduler node 300 (in step S465), for example. Then, the search process returns through a terminal C to the process from which the search process is called. The search results may include the search standard point c or may include data identifying the job J2 and the job S, for example.

This search process is terminated when a single available resource satisfying the requirement of step S463 is obtained. Details of the search process may be changed to ensure that a larger number of available resources are found. For example, the search process may return from step S465 to step S456, and the search results may include data on detected available resources and be transmitted to the master scheduler node 300 in step S455.

The search process is parallelized for search standard points and thus executed at a higher speed. Specifically, if multiple slave scheduler nodes 310 (including computing nodes 200 to which a job is not assigned in some cases) are assigned to a range to be searched, the process may be allotted to each of the search standard points.

Figure 27:
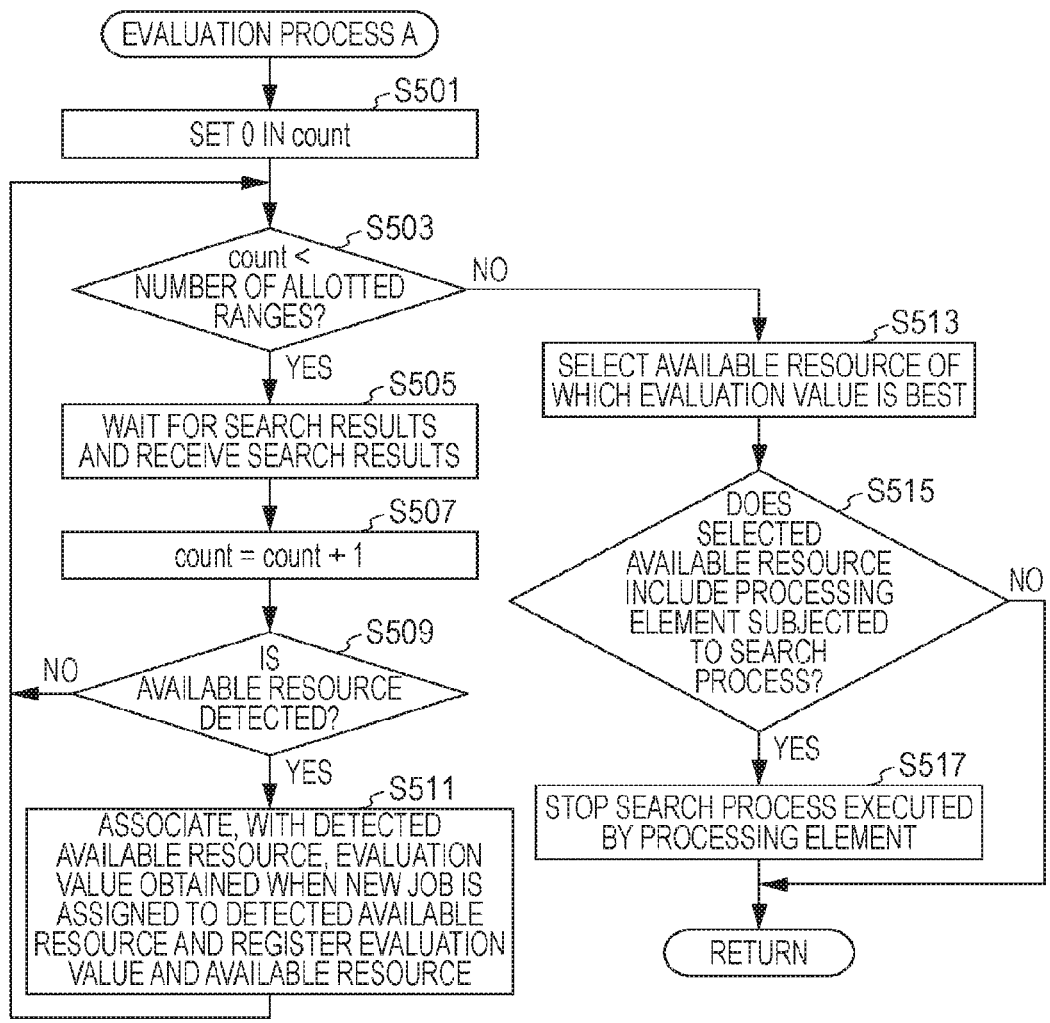
FIG. 27 is a diagram illustrating the flow of a process of evaluating search results.

Next, an example of the process (step S409) of evaluating the search results is described with reference to FIGS. 27, 28, and 30.

First, the job assignment processor 3030 of the master scheduler node 300 sets 0 in a counter variable count (in step S501). Then, the job assignment processor 3030 determines whether or not a value of the counter variable count is smaller than the number of allotted ranges (in step S503).

If the value of the counter variable count is smaller than the number of the allotted ranges (Yes in step S503), the job assignment processor 3030 waits for the search results from the slave scheduler node 310 and causes data of the search results to be stored in, for example, the data storage section 3010 (in step S505) when receiving the data of the search results.

Then, the job assignment processor 3030 increments the counter variable count by 1 (in step S507) and determines whether or not the received search results indicate the detection of an available resource (in step S509). If the received search results do not indicate the detection of the available resource, the process returns to step S503.

If the received search results indicate the detection of the available resource, the job assignment processor 3030 calculates an evaluation value when the new job is assigned to the detected available resource and the job assignment processor 3030 associates the calculated evaluation value with the available resource and registers the evaluation value and the available resource in the data storage section 3010 (in step S511). Then, the process returns to step S503.

In this process flow, if multiple available resources are appropriate for a request for the new job and found, evaluation values are calculated for the available resources based on a certain evaluation standard, and an available resource for which the highest evaluation value is calculated is selected. This is an assignment policy that is referred to as a best-fit algorithm in general, and the evaluation standard to be used is not limited to only a standard for only the "shapes" of resources to which a job is assigned.

For example, if a requirement that indicates that "the earlier an available time zone, the better the evaluation value" is set as an "evaluation standard", this results in the achievement of a "first-come priority" as an assignment policy related to a time axis. In addition, a requirement that indicates that "the smaller the degree of progress of fragmentation after the assignment, the better the evaluation value in the same available time zone", or a standard that indicates that "the higher the degree of matching of one or multiple attributes included in the job, the better evaluation value", may be used.

If the value of the counter variable count becomes equal to or larger than the number of the allotted ranges (No in step S503), the job assignment processor 3030 selects an available resource (or an available resource of which an evaluation value is the largest when a larger evaluation value is better or an available resource of which an evaluation value is the smallest when a smaller evaluation value is better) of which an evaluation value is the best (in step S513). If an available resource for which an evaluation value is calculated does not exist, the process is terminated and processes to be executed after step S513 are stopped.

Then, the job assignment processor 3030 determines whether or not a processing element (including a computing node 200) that executed the search process is included in the selected available resource (in step S515). Step S515 is executed to confirm whether or not the new job is assigned to a computing node 200 to which a job is not assigned if the computing node 200 is used as a slave scheduler node 310.

If the processing element that executed the search process is included in the selected available resource, the job assignment processor 3030 stops the search process executed by the processing element (in step S517). Then, the evaluation process returns to the process from which the evaluation process is called. If the processing element that executed the search process is not included in the selected available resource, the evaluation process returns to the process from which the evaluation process is called.

Figure 28:
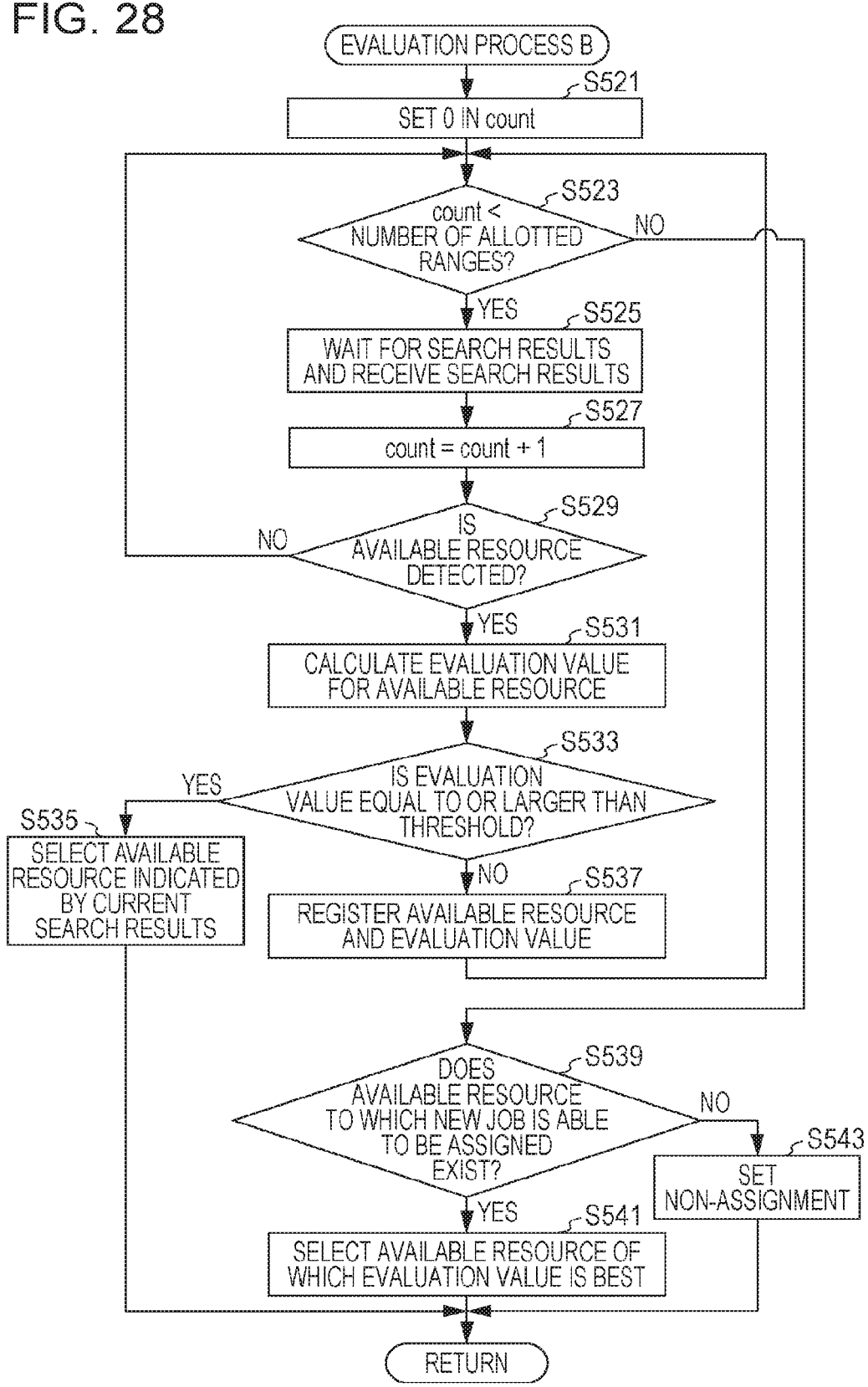
FIG. 28 is a diagram illustrating the flow of a process of evaluating the search results.

As the process (step S409) of evaluating the search results, a process illustrated in FIG. 28 may be executed.

First, the job assignment processor 3030 of the master scheduler node 300 sets 0 in the counter variable count (in step S521). Then, the job assignment processor 3030 determines whether or not the value of the counter variable count is smaller than the number of the allotted ranges (in step S523).

If the value of the counter variable count is smaller than the number of the allotted ranges (Yes in step S523), the job assignment processor 3030 waits for the search results from the slave scheduler node 310 and causes the data of the search results to be stored in, for example, the data storage section 3010 (in step S525) when receiving the data of the search results.

Then, the job assignment processor 3030 increments the counter variable count by 1 (in step S527) and determines whether or not the received search results indicate the detection of an available resource (in step S529). If the received search results do not indicate the detection of the available resource, the process returns to step S523.

If the received search results indicate the detection of the available resource, the job assignment processor 3030 calculates an evaluation value when the new job is assigned to the detected available resource (in step S531). An evaluation standard is the same as or similar to the evaluation standard used in the aforementioned example.

In the embodiment, if the calculated evaluation value is equal to or larger than a threshold (Yes in step S533), the job assignment processor 3030 selects the available resource indicated by the current search results (in step S535). Then, the evaluation process returns to the process from which the evaluation process is called.

Immediately after the available resource of which the evaluation value is equal to or larger than the threshold is detected, the new job is assigned to the available resource.

If the calculated evaluation value is smaller than the threshold (No in step S533), the job assignment processor 3030 associates the evaluation value with the available resource and registers the evaluation value and the available resource in the data storage section 3010 (in step S537). Then, the process returns to step S523.

If the value of the counter variable count is equal to or larger than the number of the allotted ranges (No in step S523), the job assignment processor 3030 determines, based on data stored in the data storage section 3010, whether or not an available resource to which the new job is able to be assigned was detected (in step S539). If the process has yet to proceed to step S531, an evaluation value is not stored for an available resource in the data storage section 3010, and the job assignment processor 3030 determines whether or not an evaluation value is associated with an available resource and stored.

If an available resource to which the new job is able to be assigned does not exist, the job assignment processor 3030 sets non-assignment (in step S543). Then, the evaluation process returns to the process from which the evaluation process is called, and processes to be executed after step S543 are not executed.

If the available resource to which the new job is able to be assigned exists, the job assignment processor 3030 selects an available resource of which an evaluation value is the best (in step S541). Then, the evaluation process returns to the process from which the evaluation process is called.

Figure 29:
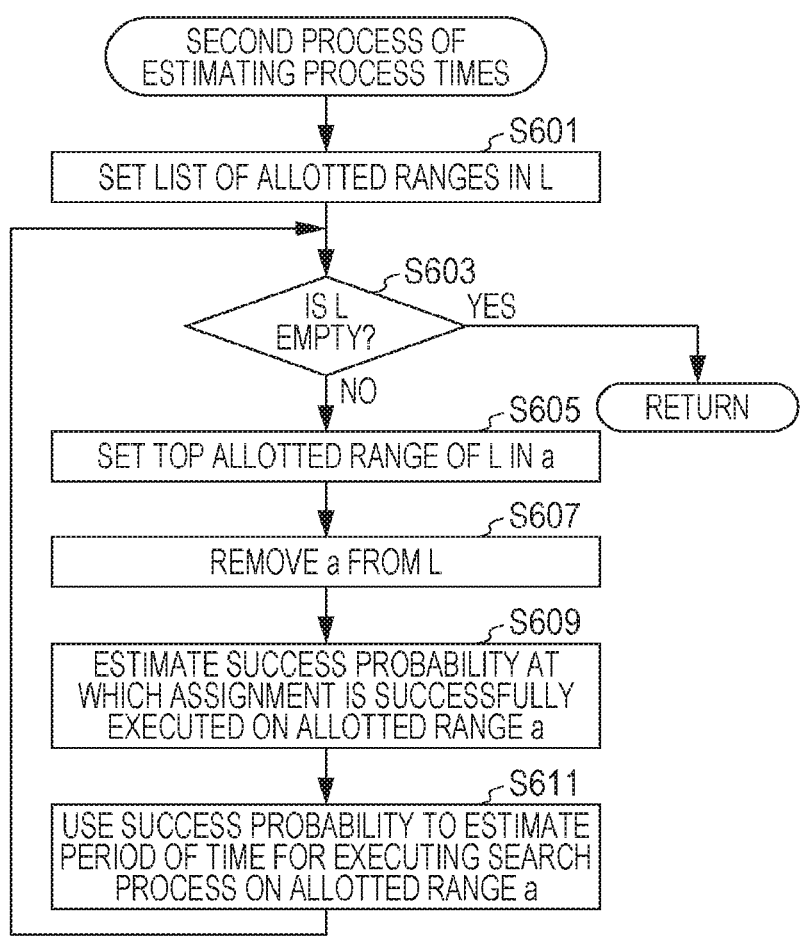
FIG. 29 is a diagram illustrating another example of the flow of the process of estimating the process times.

Next, a second example of the process of estimating the process times is described with reference to FIG. 29.

The second example assumes that an assignment policy that is referred to as a "first-fit" algorithm for assigning an available resource found first without consideration of other search results is used.

In the assignment policy, success probabilities at which assignment is successfully executed are estimated, and it is effective to assign a large number of processing elements to an allotted range in which assignment is successfully executed at a high probability in some cases. As illustrated in FIG. 28, the same applies to a case where a policy of assigning a new job to an available resource of which an evaluation value is equal to or larger than the threshold immediately after the available resource is detected is used.

The search controller 3020 sets a list of the allotted ranges in an empty set L (in step S601). Then, the search controller 3020 determines whether or not the set L is empty (in step S603). If the set L is empty, the process of estimating the process times returns to the process from which the process of estimating the process times is called.

If the set L is not empty, the search controller 3020 sets the top allotted range of the set L in the variable a (in step S605). In addition, the search controller 3020 removes the variable a from the set L (in step S607).

Then, the search controller 3020 uses data stored in the data storage section 3010 and to be used to estimate success probabilities and data of the allotted range a to estimate the success probability at which assignment is successfully executed in the allotted range a (in step S609). The success probability is estimated based on the data obtained by Bayesian inference and to be used to estimate the success probability, data of a complexity in the allotted range a, the number of connected components included in the allotted range a, and the like.

In addition, the search controller 3020 estimates a period of time (or process time) for executing the search process on the allotted range a using the data stored in the data storage section 3010 and indicating the estimated equation, the data of the allotted range a, and the calculated success probability (in step S611), for example. The process time is calculated by Kalman filtering based on the data of the complexity in the allotted range a, the number of the connected components included in the allotted range a, and the success probability and is stored in the data storage section 3010, for example. Then, the process returns to step S603.

By executing the aforementioned process, a process time is estimated for each allotted range based on a success probability calculated for each allotted range.

Figure 30:
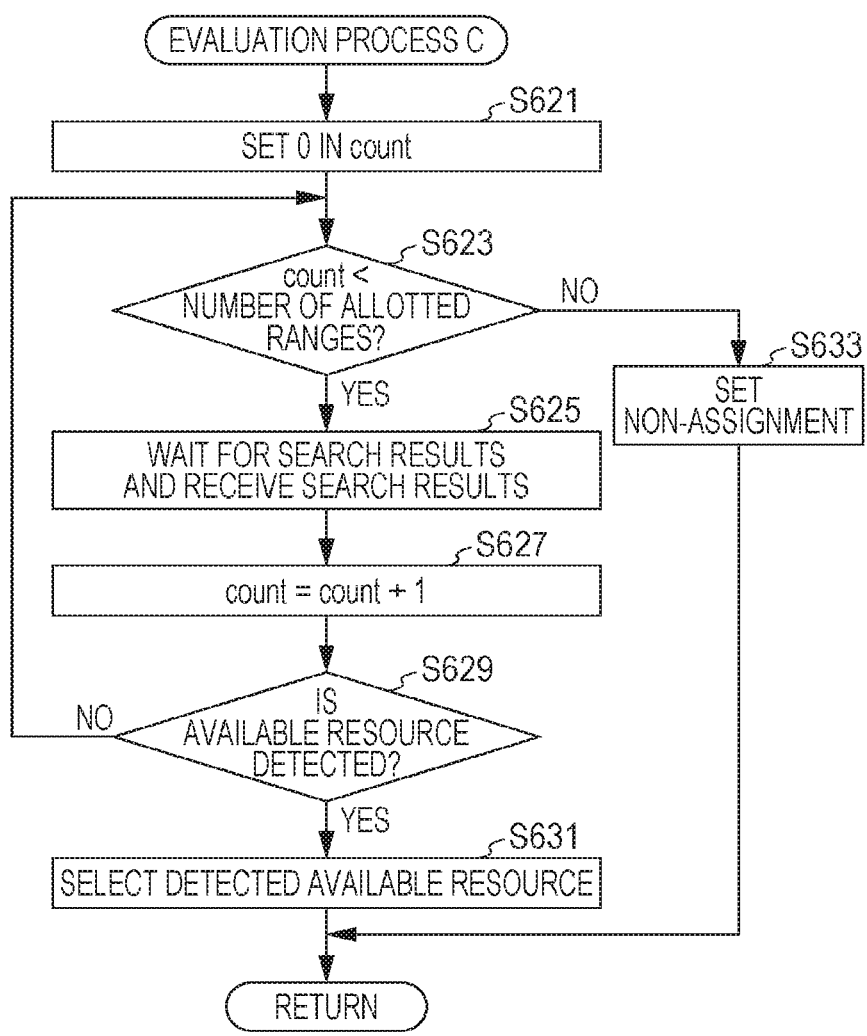
FIG. 30 is a diagram illustrating the flow of a process of evaluating the search results.

A process illustrated in FIG. 30 may be executed as the process (step S409) of evaluating the search results.

Specifically, the job assignment processor 3030 of the master scheduler node 300 sets 0 in the counter variable count (in step S621). Then, the job assignment processor 3030 determines whether or not the value of the counter variable count is smaller than the number of the allotted ranges (in step S623).

If the value of the counter variable count is smaller than the number of the allotted ranges (Yes in step S623), the job assignment processor 3030 waits for the search results from the slave scheduler node 310 and causes the data of the search results to be stored in, for example, the data storage section 3010 (in step S625) when receiving the data of the search results.

Then, the job assignment processor 3030 increments the counter variable count by 1 (in step S627) and determines whether or not the received search results indicate the detection of an available resource (in step S629). If the received search results do not indicate the detection of the available resource, the process returns to step S623.

If the received search results indicate the detection of the available resource, the job assignment processor 3030 selects the available resource indicated by the search results (in step S631). Then, the evaluation process returns to the process from which the evaluation process is called.

On the other hand, if the value of the counter variable count is equal to or larger than the number of the allotted ranges (No in step S623), the job assignment processor 3030 sets non-assignment (in step S633). Then, the evaluation process returns to the process from which the evaluation process is called. In this case, however, processes to be executed after step S633 are stopped.

APPENDIX

Although the simple data structure to be used to manage jobs is described above, a specific example in which an nth-dimensional mesh or torus network is used is described below.

FIG. 31 illustrates data on a job waiting to be executed. As illustrated in FIG. 31, a user ID, a job attribute value, and sizes in the dimensions are associated with a job ID (identifier) identifying the job. The sizes in the dimensions are the sizes, in the dimensions (first to Nth dimensions), of a region occupied by computing nodes to be used for the execution of the job.

FIG. 32 illustrates a job control table that is data on a job that is being executed.

The job control table according to the embodiment includes a job ID, a user ID, a planned start time, a planned end time, maximum values in the dimensions, minimum values in the dimensions, and data to be used to access related data. The maximum values in the dimensions are the maximum values, in the dimensions, of node coordinates used by the job that is being executed, while the minimum values in the dimensions are the minimum values, in the dimensions, of the node coordinates used by the job that is being executed.

The data to be used to access the related data includes a next job within a hash table for an available time zone, a previous job within the hash table for the available time zone, next jobs within the hash table for the dimensions, previous jobs within the hash table for the dimensions, a start point within an adjacency list for the available time zone, an end point within the adjacency list for the available time zone, start points within the adjacency list for the dimensions, end points within the adjacency list for the dimensions, a start point of the adjacency list, an end point of the adjacency list, start and end points of an opposite shore list for the job, and a pointer that points to a connected component control table.

The next jobs within the hash table indicate pointers that point to the next jobs within a "hash bucket" of the hash table (refer to FIGS. 36A to 36C) using the minimum or maximum values of coordinates in the dimensions as keys. Similarly, the previous jobs within the hash table indicate pointers that point to the previous jobs within the "hash bucket" of the hash table (refer to FIGS. 36A to 36C) using the minimum or maximum values of the coordinates in the dimensions as the keys. The last job within the hash table indicates an empty pointer.

The start point within the adjacency list for the available time zone indicates a pointer that points to the start point of the adjacency list for the time zone. The start points within the adjacency list for the dimensions indicate pointers that point to the start points of the adjacency list for the dimensions. The end point within the adjacency list for the available time zone indicates a pointer that points to the end point of the adjacency list for the time zone. The end points within the adjacency list for the dimensions indicate pointers that point to the end points of the adjacency list for the dimensions.

In the specific example, the whole adjacency list for the job is provided and the start point of the adjacency list indicates a pointer that points to the start point of the whole adjacency list. Similarly, the end point of the adjacency list indicates a pointer that points to the end point of the whole adjacency list.

The start and end points of the opposite shore list indicate pointers that point to the start and end points of the opposite shore list for the job. A pointer that points to the connected component control table is a pointer that points to a control table for a connected component to which the target job belongs.

In the embodiment, as illustrated in FIG. 33, a connected component control table that is a control table for a connected component is maintained.

The connected component control table includes a connected component ID, the earliest start time (time zone) within the connected component, the latest end time (time zone) within the connected component, the minimum values in the dimensions within the connected component, the maximum values in the dimensions within the connected component, a start point of an adjacency list for the available time zone, an end point of the adjacency list for the available time zone, start points of the adjacency list for the dimensions, end points of the adjacency list for the dimensions, start and end points of the adjacency list, and start and end points of an opposite shore list. The connected component control table may include a pointer that points to a job configuration list for constituent elements of the connected component.

In the specific example, the whole adjacency list for the target connected component is provided and the start and end points of the adjacency list indicate pointers that point to the start and end points of the whole adjacency list.

The start and end points of the opposite shore list indicate pointers that point to the start and end points of the opposite shore list for the connected component.

FIG. 34 illustrates an example of a single block of the opposite shore list for the job. The opposite shore list may include one or multiple blocks. The opposite shore list includes pointers pointing to job control tables for jobs included in the opposite shore list, a pointer pointing to the next block, and a pointer pointing to the previous block. If the opposite shore list is increased in size, job control tables may be managed using multiple blocks.

Similarly, FIG. 35 illustrates an example of a single block of the opposite shore list for the connected component. The opposite shore list for the connected component may include one or multiple blocks. The opposite shore list for the connected component includes pointers pointing to connected component control tables for connected components included in the opposite shore list, a pointer pointing to the next block, and a pointer pointing to the previous block. If the opposite shore list is increased in size, connected component control tables may be managed using multiple blocks.

The adjacency list for the job and the adjacency list for the connected component have structures that are the same as or similar to the aforementioned structures illustrated in FIGS. 34 and 35.

Next, the hash table is described. The hash table is information that is used to manage the positions (node coordinate positions) of jobs that are assigned in a node coordinate space and are being currently executed. The hash table is the information serving as a key of the search process.

The hash table is information of (a number N of) hashes obtained using, as keys, node coordinate values of the currently executed jobs in the dimensions in the node coordinate space.

Figure 36B:
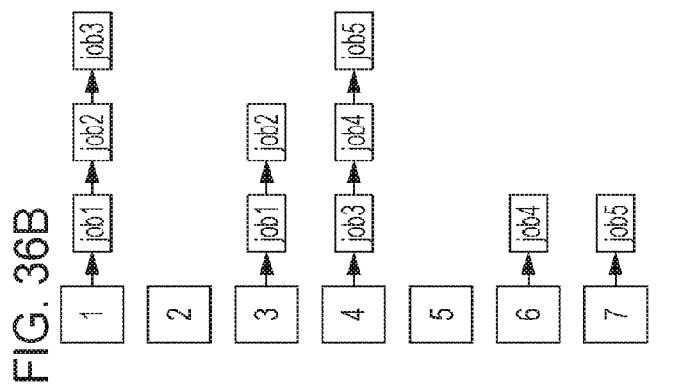
FIGS. 36A, 36B, and 36C are diagrams describing a hash table.
Figure 36A:
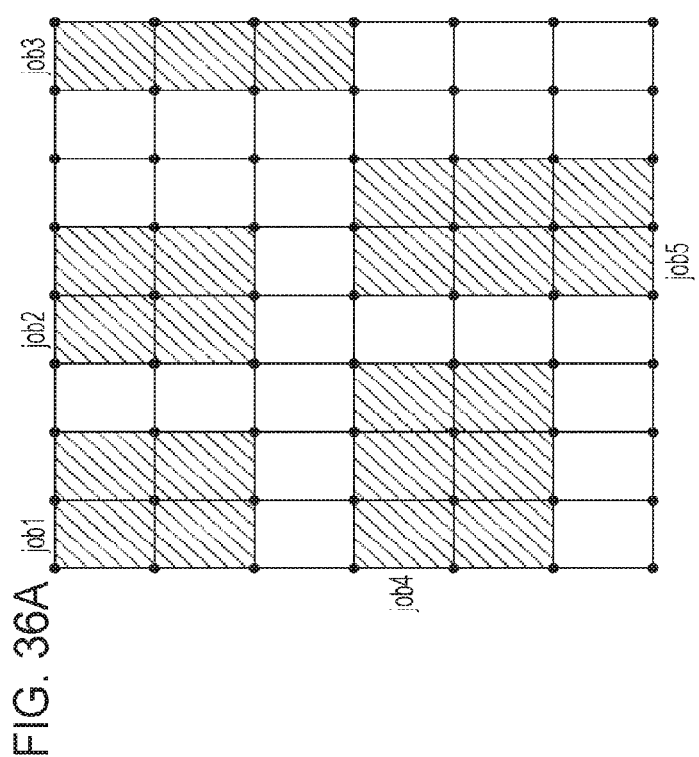
Figure 36C:
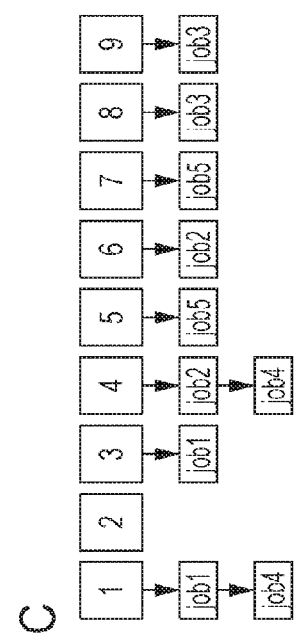

FIGS. 36A, 36B, and 36C are diagrams describing the hash table. FIG. 36A is a diagram exemplifying a mesh, FIG. 36B illustrates a hash table of currently executed jobs that is related to an ordinate dimension of the mesh illustrated in FIG. 36A, and FIG. 36C illustrates a hash table of the currently executed jobs that is related to an abscissa dimension of the mesh illustrated in FIG. 36A.

In the hash table, the positions (node coordinate positions) of jobs that are assigned in the node coordinate space and are being currently executed are associated for dimensional axes forming the node coordinate axes and are managed.

For example, in the node coordinate space of the mesh illustrated in FIG. 36A, an abscissa direction (abscissa dimension) and an ordinate direction (ordinate dimension) are defined. In the node coordinate space, the hash table includes the hash table (refer to FIG. 36B) related to the abscissa dimension and the hash table (refer to FIG. 36C) related to the ordinate dimension.

In the hash table, for each job, a pointer that points to an entry corresponding to the job in a job control table is stored in entries corresponding to the minimum and maximum values of node coordinates of the job in the dimensions.

As illustrated in FIG. 36A, five jobs indicated by job1 to job5 are assigned to coordinates of a mesh of 9 (in the abscissa)×7 (in the ordinate) vertices. For example, in FIG. 36A, coordinates (node coordinates) of four corners (vertices) of job4 are (1, 4), (4, 4), (1, 6), and (4, 6). Thus, the maximum value of the node coordinates of job4 in the abscissa is 4, while the minimum value of the node coordinates of job4 in the abscissa is 1.

In this case, job4 is associated with an entry corresponding to the coordinate value 1 and an entry corresponding to the coordinate value 4 in the hash table for the abscissa dimension, as illustrated in FIG. 36C. Similarly, since the maximum value of the node coordinates of job4 in the ordinate is 6 and the minimum value of the node coordinates of job4 in the ordinate is 4, job4 is associated with an entry corresponding to the coordinate value 4 and an entry corresponding to the coordinate value 6 in the hash table for the ordinate dimension, as illustrated in FIG. 36B.

Specifically, in the assignment or the registration in the hash table, a pointer that points to a job control table (refer to FIG. 32) for a corresponding job is registered using the minimum and maximum values of coordinates as keys. In addition, the pointer that points to the job control table for the job is registered upon the start of the execution of the job.

The collision of hash values is processed by a "hash bucket" algorithm. Specifically, structural bodies corresponding to the same key are coupled using a pointer. The collision of keys is processed by the "hash bucket" algorithm or a method of queueing in a pointer storage region.

In the aforementioned case, the slave scheduler nodes 310 each hold an opposite shore list. There may be a case where if an available computing node 200 is used as a processing element for the search process, the efficiency of the process is improved by sharing information with the second and further nearest neighbors of the computing node 200 (for example, by providing a notification indicating that the search process was terminated). For example, the aforementioned case corresponds to a case where communication that is to be executed in order to "terminate a process executed by another processing element because an available resource was found" starts simultaneously with notification to a component to which a resource is actually assigned if the policy (or the first-fit algorithm) of "assigning the available resource found earliest and able to be assigned" is used.

Although the embodiment is described above, the embodiment is not limited to the above description. For example, the aforementioned functional blocks may not match a program module configuration. In the aforementioned process flows, the orders of the processes and the orders of the steps may be changed as long as the results of the processes do not change.

In addition, as described above, the processes to be executed by each of the slave scheduler nodes 310 may be executed by the master scheduler node 300. The data held by each of the slave scheduler nodes 310 may be held by the master scheduler node 300.

In the above description, in the processes executed on a job, when the job is identified, a computing node to which the job was assigned is identified. The job, however, may be associated with a subgraph of the computing node 200 to which the job was assigned, while data of the job and the like may be managed.

The aforementioned embodiment is summarized as follows.

An information processing method according to a first aspect of the embodiment includes (A) managing data on a first subgraph that is included in a graph including a plurality of vertices indicating computing resources of a computer system and a plurality of edges indicating links between the computing resources and is provided for a first computing resource to which one or more first jobs are assigned, or data on a second subgraph that is included in the graph and connected to the first subgraph through a vertex indicating a computing resource to which none of the one or more first jobs is assigned in the graph and that is provided for a second computing resource to which a second job is assigned, or data on the second job, and (B) using the data to determine, based on the first subgraph, whether or not a third computing resource to which a third job is to be assigned exists.

Since the aforementioned data is maintained and managed in advance, the process of determining whether or not the third computing resource to which the third job is to be assigned exists is executed at a high speed.

The aforementioned management process may include (a1) a process of updating the aforementioned data when data on a fourth subgraph for a fourth computing resource to which a fourth job is newly assigned is received or when data on a fifth subgraph for a fifth computing resource to which a fifth job is assigned and that is released due to the termination of the fifth job is received. This is due to the fact that the second subgraph may change in the aforementioned case.

The aforementioned update process may be executed in a time zone in which the aforementioned determination process is not executed. In this case, the update process may be executed to update the data without affecting the process of determining whether or not the third computing resource to which the third job is to be assigned exists.

An information processing method according to a second aspect of the embodiment includes (A) acquiring at least any of (a1) the ratio of the number of vertices that correspond to computing resources to which a job is not assigned and that are adjacent to a subgraph included in a graph including a plurality of vertices indicating computing resources of a computer system and a plurality of edges indicating links between the computing resources to the number of vertices belonging to the subgraph for computing resources to which a certain job is assigned, (a2) the ratio of the number of vertices that are adjacent to a plurality of vertices belonging to the subgraph and correspond to computing resources to which a job is not assigned to the number of the vertices belonging to the subgraph, (a3) the ratio of the number of vertices that belong to the subgraph and are adjacent to vertices corresponding to computing resources to which a job is not assigned and that are adjacent to the subgraph to the number of the vertices belonging to the subgraph, (a4) the ratio of the number of edges that are located between vertices belonging to the subgraph and vertices adjacent to the subgraph and corresponding to computing resources to which a job is not assigned to the number of the vertices belonging the subgraph, and (a5) the ratio of the number of the edges that are located between the vertices belonging to the subgraph and the vertices adjacent to the subgraph and corresponding to the computing resources to which a job is not assigned to the number of edges between the vertices belonging to the subgraph, and (B) calculating, based on the acquired ratio, an index value related to a load applied due to the search of a computing resource to which another job is to be assigned using the subgraph as a standard.

By introducing the new parameter (for example, the complexity described in the embodiment) for the graph indicating the computer system, the index value related to the load applied due to the search of the computing resource may be appropriately calculated.

In addition, the information processing method according to the second aspect may include a process of determining, based on the index value, the number of processing elements in order to search the computing resource to which the other job is to be assigned using the subgraph as the standard. In this case, if the search process is executed in parallel, process times may not be significantly different from each other.

In addition, the aforementioned calculation process may include (b1) a process of calculating, based on the acquired ratio and first set data, a probability at which the computing resource to which the other job is to be assigned is successfully searched using the subgraph as the standard, and (b2) a process of calculating the index value based on the acquired ratio, the calculated probability, and second set data. For example, a large number of processing elements may be assigned to a subgraph in which a computing resource to which a job is to be assigned is successfully searched at a high probability.

In addition, the information processing method according to the second aspect may include a process of executing the aforementioned acquisition process and the aforementioned calculation process on a plurality of subgraphs. In this case, the aforementioned determination process may include a process of determining the number of processing elements for each of the plurality of subgraphs based on a plurality of index values calculated for the plurality of subgraphs.

A program that causes the processor or a computer to execute the aforementioned processes may be generated. The program is stored in a storage device or a computer-readable storage medium such as a flexible disk, an optical disc such as a CD-ROM, a magneto-optical disc, a semiconductor memory (for example, a ROM), or a hard disk. Data that is being processed is temporarily stored in a storage device such as a RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A job management device, comprising:
a memory; and
one or more processors coupled to the memory and configured to:
acquire a ratio that indicates at least one of
a first ratio of a number of vertices, that correspond to computing resources to which a job is not assigned and that are adjacent to a subgraph included in a graph including a plurality of vertices indicating computing resources of a computer system, and a plurality of edges indicating links between the computing resources to a number of vertices belonging to the subgraph for computing resources to which a certain job is assigned,
a second ratio of a number of vertices that are adjacent to a plurality of vertices belonging to the subgraph and that correspond to computing resources to which a job is not assigned to the number of the vertices belonging to the subgraph,
a third ratio of a number of vertices that belong to the subgraph and are adjacent to the plurality of vertices corresponding to computing resources to which a job is not assigned and that are adjacent to the subgraph to the number of the vertices belonging to the subgraph,
a fourth ratio of a number of edges that are located between vertices belonging to the subgraph and vertices adjacent to the subgraph and corresponding to computing resources to which a job is not assigned to the number of the vertices belonging the subgraph, and
a fifth ratio of a number of the edges that are located between the vertices belonging to the subgraph and the vertices adjacent to the subgraph and corresponding to the computing resources to which a job is not assigned to the number of edges between the vertices belonging to the subgraph;
calculate, based on the ratio, an index value related to a load to be applied due to a search, to be performed, of a computing resource to which another job is to be assigned;
determine, based on the index value, a number of processing elements in order to perform the search of the computing resource to which the another job is to be assigned;
control the number of processing elements to perform the search of the computing resource using the subgraph as an evaluation standard for the search; and
assign, based on results of the search, the another job to the computing resource.

2. The job management device according to claim 1, wherein the one or more processors coupled to the memory are configured to calculate, based on the ratio, a probability at which the computing resource to which the another job is to be assigned is successfully searched, and
calculate the index value based on the ratio and the probability.

3. The job management device according to claim 1, wherein the one more processors coupled to the memory are configured to
acquire a plurality of ratios for a plurality of subgraphs,
calculate a plurality of index values based on each subgraph of the plurality of subgraphs, and
determine the number of processing elements for each subgraph of the plurality of subgraphs based on the plurality of index values calculated for the plurality of subgraphs.

4. A job management method, comprising:
acquiring, by a job management device including a memory and one or more processors, a ratio that indicates at least one of
a first ratio of a number of vertices, that correspond to computing resources to which a job is not assigned and that are adjacent to a subgraph included in a graph including a plurality of vertices indicating computing resources of a computer system, and a plurality of edges indicating links between the computing resources to a number of vertices belonging to the subgraph for computing resources to which a certain job is assigned,
a second ratio of a number of vertices that are adjacent to a plurality of vertices belonging to the subgraph and that correspond to computing resources to which a job is not assigned to the number of the vertices belonging to the subgraph,
a third ratio of a number of vertices that belong to the subgraph and are adjacent to the plurality of vertices corresponding to computing resources to which a job is not assigned and that are adjacent to the subgraph to the number of the vertices belonging to the subgraph,
a fourth ratio of a number of edges that are located between vertices belonging to the subgraph and vertices adjacent to the subgraph and corresponding to computing resources to which a job is not assigned to the number of the vertices belonging the subgraph, and
a fifth ratio of a number of the edges that are located between the vertices belonging to the subgraph and the vertices adjacent to the subgraph and corresponding to the computing resources to which a job is not assigned to the number of edges between the vertices belonging to the subgraph;
calculating, based on the ratio, an index value related to a load to be applied due to a search, to be performed, of a computing resource to which another job is to be assigned;
determining, by the job management device based on the index value, a number of processing elements in order to search the computing resource to which the another job is to be assigned;
controlling the number of processing elements to perform the search of the computing resource using the subgraph as an evaluation standard for the search; and
assigning, based on results of the search, the another job to the computing resource.

5. A non-transitory computer readable medium storing computer executable instructions which, when executed by one or more processors of a computer, cause the computer to perform a method comprising:

acquiring a ratio that indicates at least one of a first ratio of a number of vertices, that correspond to computing resources to which a job is not assigned and that are adjacent to a subgraph included in a graph including a plurality of vertices indicating computing resources of a computer system, and a plurality of edges indicating links between the computing resources to a number of vertices belonging to the subgraph for computing resources to which a certain job is assigned, a second ratio of a number of vertices that are adjacent to a plurality of vertices belonging to the subgraph and that correspond to computing resources to which a job is not assigned to the number of the vertices belonging to the subgraph, a third ratio of a number of vertices that belong to the subgraph and are adjacent to the plurality of vertices corresponding to computing resources to which a job is not assigned and that are adjacent to the subgraph to the number of the vertices belonging to the subgraph, a fourth ratio of a number of edges that are located between vertices belonging to the subgraph and vertices adjacent to the subgraph and corresponding to computing resources to which a job is not assigned to the number of the vertices belonging the subgraph, and a fifth ratio of a number of the edges that are located between the vertices belonging to the subgraph and the vertices adjacent to the subgraph and corresponding to the computing resources to which a job is not assigned to the number of edges between the vertices belonging to the subgraph;

calculating, based on the ratio, an index value related to a load to be applied due to a search, to be performed, of a computing resource to which another job is to be assigned;

determining, based on the index value, a number of processing elements in order to search the computing resource to which the another job is to be assigned;

controlling the number of processing elements to perform the search of the computing resource using the subgraph as an evaluation standard for the search; and assigning, based on results of the search, the another job to the computing resource.

\* \* \* \* \*